United States Patent
Moulden, Jr. et al.

(10) Patent No.: US 7,343,587 B2
(45) Date of Patent: *Mar. 11, 2008

(54) SYSTEM FOR CREATING, MANAGING AND EXECUTING COMPUTER TESTING AND TASK MANAGEMENT APPLICATIONS

(75) Inventors: Fred A. Moulden, Jr., Sunnyvale, CA (US); Raymond Horgan, Mountain View, CA (US); Erik P. Seilnacht, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/415,081

(22) Filed: May 2, 2006

(65) Prior Publication Data

US 2006/0206870 A1    Sep. 14, 2006

Related U.S. Application Data

(63) Continuation of application No. 09/075,844, filed on May 12, 1998, now Pat. No. 7,039,912.

(51) Int. Cl.
*G06F 9/44* (2006.01)
(52) U.S. Cl. ...................... 717/124; 718/100
(58) Field of Classification Search ............... 719/310, 719/328; 718/100; 717/124, 125; 714/38, 714/25
See application file for complete search history.

(56) References Cited

U.S. PATENT DOCUMENTS

| 5,371,883 A | 12/1994 | Gross et al. |
| 5,410,681 A | 4/1995 | Jessen et al. |
| 5,421,004 A | 5/1995 | Carpenter et al. |

(Continued)

OTHER PUBLICATIONS

Bowen "A Survey of Standards and Proposed Metrics for Software Quality Testing" 1979 IEEE, pp. 37-42.*

(Continued)

*Primary Examiner*—Van Nguyen
(74) *Attorney, Agent, or Firm*—Buchanan Ingersoll & Rooney PC

(57) ABSTRACT

A system stored on a computer-readable storage medium for testing computer software, including: a plurality of heterogeneous test tools; a testing application that provides an interface that enables a user to collectively access each of said plurality of heterogeneous test tools; and a plurality of modules that interact with the testing application for creating and modifying, via said interface, a test that is implemented with said plurality of test tools, including: a tool manager module for selecting one or more tools, from among said plurality of test tools, to be employed in a test; a case manager module for selecting test cases, each comprising an elemental executable test, that are performed by selected tools, for inclusion in the test; and a suite manager module for creating, modifying and selecting test suites, each comprising at least one group of selected test cases, to be executed during the test.

8 Claims, 26 Drawing Sheets

U.S. PATENT DOCUMENTS

| | | | |
|---|---|---|---|
| 5,600,789 A * | 2/1997 | Parker et al. ................. | 714/38 |
| 5,634,098 A | 5/1997 | Janniro et al. | |
| 5,671,351 A * | 9/1997 | Wild et al. .................... | 714/38 |
| 5,715,373 A * | 2/1998 | Desgrousilliers et al. ..... | 706/47 |
| 5,724,273 A * | 3/1998 | Desgrousilliers et al. ... | 702/120 |
| 5,745,675 A | 4/1998 | Herbig et al. | |
| 5,751,941 A | 5/1998 | Hinds et al. | |
| 5,758,062 A * | 5/1998 | McMahon et al. ............ | 714/38 |
| 5,781,720 A * | 7/1998 | Parker et al. ................. | 714/38 |
| 5,892,949 A * | 4/1999 | Noble ........................ | 717/125 |
| 5,896,494 A | 4/1999 | Perugini et al. | |
| 5,950,000 A | 9/1999 | O'Leary et al. | |
| 6,067,639 A * | 5/2000 | Rodrigues et al. ............ | 714/38 |
| 6,353,897 B1 | 3/2002 | Nock et al. | |

OTHER PUBLICATIONS

Rapps et al. "Selecting Software Test Data Using Flow Information" 1985 IEEE, pp. 367-375.*

Guowei "Software Reliability—Growth Test and the Software reliability—Testing Platform" 1997 IEEE, pp. 171-174.*

* cited by examiner

SYSTEM FOR CREATING, MANAGING AND EXECUTING COMPUTER TESTING AND TASK MANAGEMENT APPLICATIONS

CROSS REFERENCE TO RELATED APPLICATIONS

This application is a continuation of application Ser. No. 09/075,844, filed May 12, 1998, now U.S. Pat. No. 7,039,912.

FIELD OF THE INVENTION

The present invention relates to computer testing and computer task management, and more particularly, to methods and apparatus for creating, managing and executing testing routines and other task schedules on both stand alone and distributed computing systems.

BACKGROUND OF THE INVENTION

As computer systems grow ever more powerful and complex, so do computer testing and task management utilities grow ever more sophisticated. For example, today's average commercial application developer requires highly flexible and comprehensive testing mechanisms to ensure that his or her product will function properly on the wide variety of presently available computing platforms. As a result, much effort has been directed toward the development of computer testing and task management tools. For example, Apple Computer, Inc. of Cupertino, Calif. has developed several computer testing tools, including VU® (Virtual User) and MATT® (MacIntosh® Application Program Interface Test Tool). These and other testing tools allow an application developer to evaluate a work in progress without having to expend undue energy in creating the test routines themselves. Using VU, for example, an application developer can write test scripts to simulate an end user's interaction with an evolving product. Alternatively, MATT enables a developer to build custom testing sequences using predefined testing modules. A detailed description of VU is provided, for example, with Apple Computer Inc.'s Developer CD Series (November 1997 or later).

Though known testing tools are quite powerful, each providing a unique blend of features and advantages, the great diversity between available testing tools can, ironically, lead to inefficiencies in overall application development for an organization. In other words, since each available tool utilizes a different protocol and provides a different user interface, significant time and money must be expended merely in training application developers and testers as to how to interact with the various tools. Each time an individual is introduced to a new testing tool, he or she must first master operation of the tool itself before true test development and application evaluation can proceed. Furthermore, the creators of the various test tools must expend energy in developing the protocols and user interfaces in the first instance. Given the complexity of today's testing tools, these learning curves and programming expenditures can be considerable. Consequently, there is a very real need for improved methods and apparatus for creating, managing and executing computer tests and other tasks.

SUMMARY OF THE INVENTION

The present invention fulfills the above-described and other needs by providing methods and apparatus for constructing integrated computer testing and task management applications. According to the invention, a single integrated testing or task management application can provide a user access to multiple testing or task management tools, all through a single, uniform interface. Thus, users need only learn one interface, and test tool developers need not expend undue energy creating custom interfaces. As a result, resources can be more appropriately focused on actual test tool development and application testing.

Exemplary integrated testing applications according to the invention control test tools through a well defined communications interface, either locally on a single machine or in a distributed fashion across multiple networked machines. Advantageously, such applications provide a scalable, tool independent testing framework, and thereby enable an organization to readily create sophisticated testing solutions using a heterogeneous mix of available testing and task management tools. Using the methods and apparatus of the invention, organizations can combine, schedule, regress, and report tests and other tasks with a degree of flexibility that was not previously possible using conventional techniques.

The power of an integrated application according to the invention is due in significant measure to the underlying application architecture. According to exemplary embodiments, independent code managers, or plug-ins, communicate with one another through well defined interfaces to coordinate testing functions and to thereby increase user productivity. For example, a user can schedule any available test to execute on any available system at any time of day. Further, the user can specify conditions of test execution at both the test module and application levels (e.g., the user can specify that one application is to execute only if another application reports failure, or that test modules for a particular application are to execute based on previously obtained results). Advantageously, all such functionality is provided without requiring scripting on the part of the user.

The modular architecture of an integrated testing application constructed according to the invention also allows an application user to customize certain aspects of the application to meet user-specific needs. Further, integrated applications according to the invention allow users to create portable test description and data files which can be archived and thereafter shared by many users. Such data sharing can significantly increase overall development efficiency within an organization.

According to one exemplary embodiment, an integrated computer task management system includes at least one task machine configured to execute programming instructions, a plurality of task tools (each task tool configured to execute machine-specific task cases on a particular task machine), and a task manager in communication with each of the task tools. Advantageously, the task manager enables a user of the task management system to specify and execute collections of machine-specific task cases, wherein each collection of task cases can include task cases configured for execution on any of the task machines. The at least one task machine can be, for example, a test tool machine, and the task tools can be, for example, test tools. Additionally, the task cases can be, for example, test cases.

Advantageously, the task manager can include a tool manager, a case manager, a suite manager, a context manager and/or a report manager. In exemplary embodiments, the tool manager enables a user to view and select available test tools and/or save and retrieve lists of selected test tools. Exemplary case managers enable a user to view and select available test cases and/or save and retrieve lists of selected test cases, and exemplary context managers enable a user to specify hardware and software contexts and/or save and retrieve lists of specified contexts. Further, exemplary report managers enable a user to specify that reports are to be generated for test suites in a test project and also enable a user to view, save and retrieve test results for test suites, test groups and test cases in a test project. Exemplary suite managers according to the invention enable a user to specify test groups and test cases for test suites in a test project and also enable a user to link test suites in a test project such that execution of at least one test suite is conditioned upon execution of another test suite. The exemplary suite managers also enable a user to specify contexts, reports and execution schedules for test suites within test projects.

An exemplary method for managing tasks in a computer system according to the invention includes the steps of running a task management application on a host machine and simultaneously running a plurality of task tool applications on at least one task machine. According to the exemplary method, each of the task tool applications is configured to execute machine-specific tasks on the task machine upon which the task tool application is running. The exemplary method also includes the step of using the task management application to specify and execute collections of machine-specific tasks, wherein each collection of tasks can include tasks configured for execution on any of the available task machines.

The above-described and other features and advantages of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION OF THE INVENTION

To facilitate understanding of the present invention and the advantages offered thereby, features of the invention are often described and illustrated hereinafter with reference to several well known hardware and software products provided by Apple Computer, Inc. It will be appreciated by those having familiarity with the relevant technology, however, that the principles of the present invention are not limited to the referenced products and that said principles are equally applicable in any computer operating environment in which it is desirable to provide an integrated task management system. Further, although embodiments of the invention are described hereinafter with respect to integrated management of computer testing tasks, those of ordinary skill in the art will readily appreciate that the principles of the invention are equally applicable to the integrated management of all types of computer tasks, irrespective of whether said tasks involve computer testing in particular.

Figure 1:
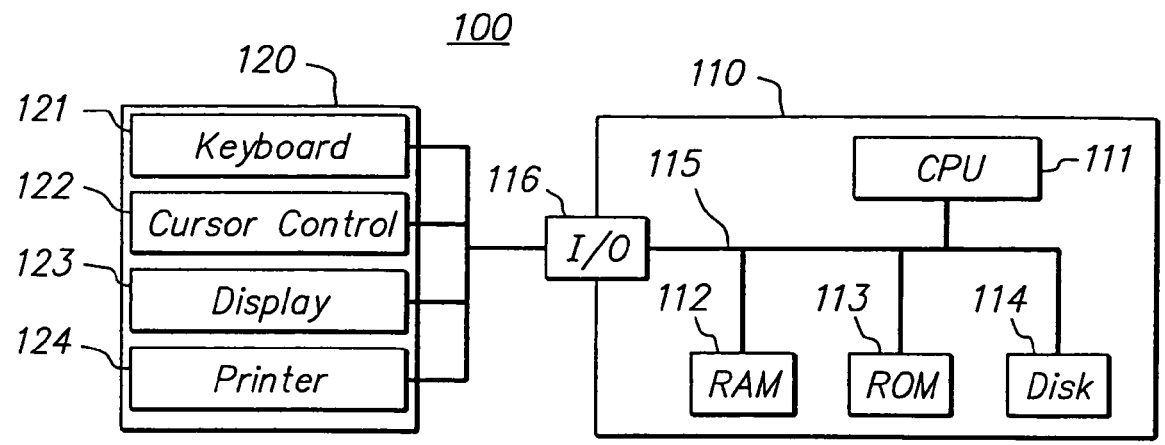
FIG. 1 depicts basic components in an exemplary computer system in which embodiments of the present invention can be implemented.

FIG. 1 depicts components in a general purpose computer system 100 in which embodiments of the present invention can be implemented. As shown, the computer system 100 of FIG. 1 includes a computer 110 and a variety of external peripheral devices 120 connected thereto. The computer 110 includes a central processing unit 111, a main memory 112 (which is typically implemented in the form of a random access memory), a static memory 113 (which typically comprises a read only memory), and a permanent storage device 114 such as a magnetic or optical disk. As shown, the central processing unit 111 communicates with each form of memory 112, 113, 114 via an internal communications bus 115. The peripheral devices 120 include a data entry device 121, such as a keyboard, and a pointing or cursor control device 122, such as a mouse, trackball or the like. A display device 123, such as a CRT monitor or an LCD screen, provides a visual display of the information that is processed within the computer, for example the contents of a document or the input and output of a software application. A hard copy of such information can be provided through a printer 124 or similar such device. Each of the external peripheral devices 120 communicates with the central processing unit 111 by way of one or more input/output ports 116 of the computer 110.

Figure 2:
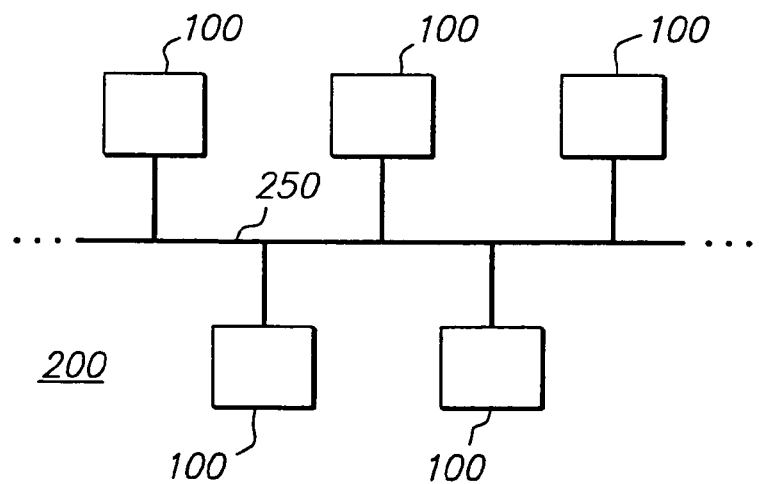
FIG. 2 depicts an exemplary computer network in which embodiments of the present invention can be implemented.

FIG. 2 depicts a computer network system 200 in which embodiments of the present invention can be implemented, the network system 200 including a plurality of computer systems 100 such as that shown in FIG. 1. As shown, each of the computer systems 100 is linked to a shared network 250 such that any of the computer systems 100 can selectively communicate with any other of the computer systems 100 in the overall network 200. The network 250 can be, for example, a local area network (LAN), a wide area network (WAN), or the Internet. Further, communications channels within the network 250 can include high-capacity conducting cables, telephone lines, fiber optic links, radio and microwave interfaces, etc. Techniques for interconnecting computer systems to form the network system 200 of FIG. 2 are well known.

Turning now to the exemplary embodiments, it will be apparent to those of skill in the art that, at a highest level of abstraction, the present invention demonstrates that diverse task management utilities can be integrated to form a cohesive and powerful overall task management system, irrespective of the particular characteristics of the individual utilities. Thus, embodiments of the invention can be used, for example, to integrate testing tools (i.e., tools for evaluating software applications and/or hardware operation and performance), research tools (i.e., tools for executing computer modeling, simulation and/or analysis routines), and system administration tools (i.e., tools for performing various housekeeping tasks, including file backups, network time synchronization, etc.). However, in order to facilitate discussion of the invention and to clarify certain aspects thereof, embodiments of the invention are described hereinafter with respect to testing tools designed to assist software application developers and testers. It will be understood that the described techniques are equally applicable to any of the above described and other task management tools.

Figure 3:
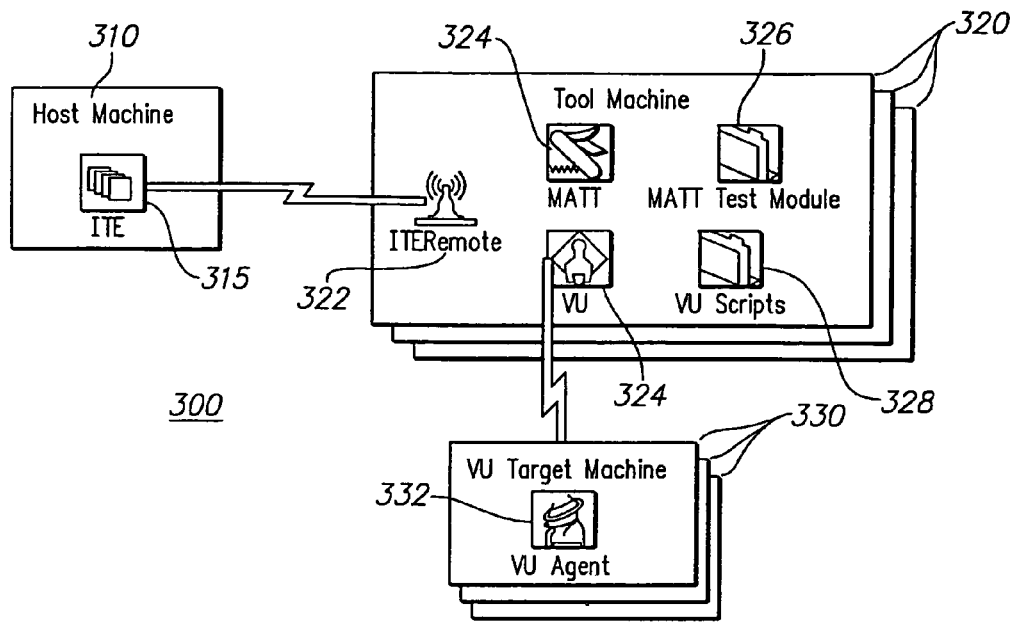
FIG. 3 depicts an exemplary integrated testing system according to the invention.

FIG. 3 depicts an integrated testing system 300 according to the invention. As shown, the integrated testing system 300 includes a host machine 310, one or more tool machines 320 and one or more optional target machines 330. The host machine 310 includes an integrated testing application 315, and an exemplary tool machine 320 includes a remote testing application 322 and one or more test tools 324. Further, an exemplary target machine 330 includes a test tool agent 332. The overall integrated testing system 300 can be implemented via a network system such as that depicted in FIG. 2, wherein the host machine 310, the tool machines 320 and the target machines 330 are implemented using separate general purpose computer systems such as those depicted in FIG. 1. Alternatively, the host machine 310, the tool machines 320 and the target machines 330 can be implemented on a single computer system.

In operation, the integrated test application 315 communicates with the test tools 324 via the remote application 322 and in accordance with a well defined communications protocol as is described in detail below. As shown, each test tool 324 can be any known test tool, including the above described VU and MATT tools by Apple Computer, Inc. Such test tools 324 are designed to execute test cases (i.e., elemental executable testing blocks) for a particular machine. In the case of VU, for example, test cases are defined by script files which are executed on a target machine 330 that can be different from the tool machine upon which the VU test tool is running. For MATT, on the other hand, test cases are predefined code segments within test modules which are executed directly on the tool machine upon which the MATT test tool is running.

Conventionally, a test tool user would specify test cases using separate interfaces provided by the various test tool applications 324. According to the invention, however, the user accesses, manages, selects and executes test cases (and analyzes test results) for all available test tools 324 via a single user interface provided by the integrated testing application 315 at the host machine 310. Advantageously, the integrated testing application 315 communicates with and controls the test tools 324 to thereby allow the user to create and/or specify sophisticated testing schemes including a heterogeneous mix of test cases which can be associated with any or all of the test tools 324 in the system 300. Using only the integrated testing application interface, a user can create a test project (or select an already existing test project), execute the test project, and thereafter view the results provided by the test project. Further, each test case (or collection of test cases) in a project can be conditioned upon results obtained from a previously executed test case (or collection of test cases). Thus, the integrated testing application of the invention enables the user to construct testing projects which are far more powerful than those obtained using the test tools individually. In other words, the integrated testing application 315 not only provides access to a variety of test tools 324, but also creates synergy among the test tools 324.

Figure 4:
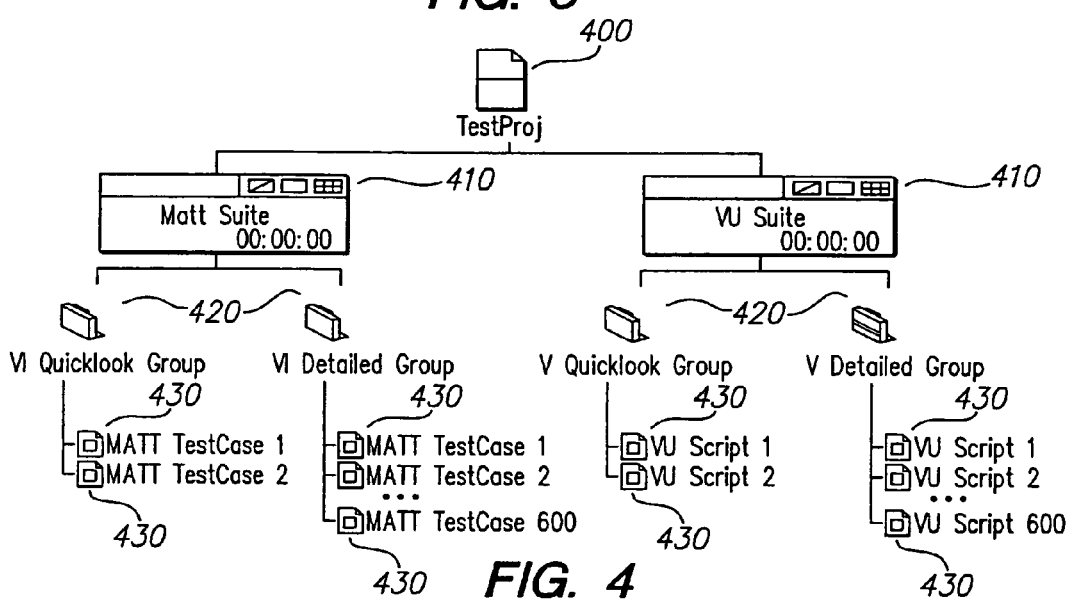
FIG. 4 depicts an exemplary testing project hierarchy according to the invention.

A hierarchy for an exemplary test project created in accordance with the invention is depicted in FIG. 4. As shown, the exemplary test project 400 can include one or more logically related test suites 410, and each test suite 410 can in turn include a structured collection of one or more test groups 420. Further, each test group 420 can include a sequence of test cases to be executed by a single test tool, each test case being an executable element that is controllable by a particular test tool. For example, a MATT test case is a single executable code segment (e.g., an Application Program Interface call or a toolbox call), and a VU test case is an executable script (e.g., to simulate mouse movements and keystrokes). Characteristics of the various aspects of a test project are described in more detail below.

Figure 5:
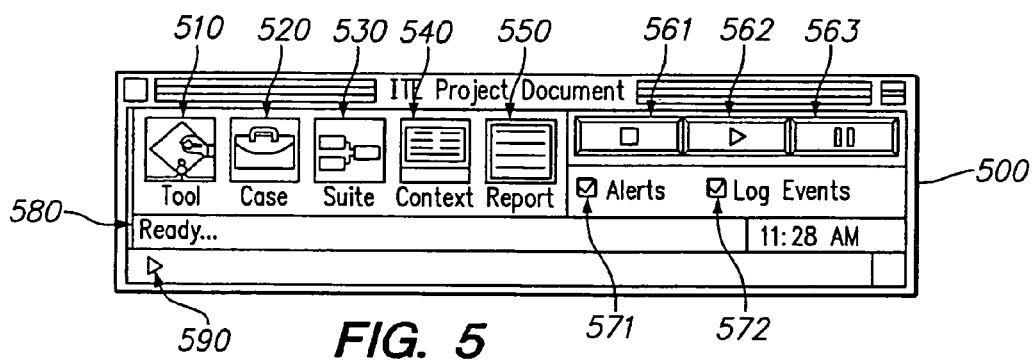
FIG. 5 depicts an exemplary user interface for an integrated testing application according to the invention.

According to the invention, a user creates, executes and views the results of a test project such as that depicted in FIG. 4 via a single integrated testing application interface. An exemplary interface according to the invention is depicted in FIG. 5. As shown, the exemplary interface 500 includes five project manager buttons 510, 520, 530, 540, 550, three execution control buttons 561, 562, 563, two execution control check boxes 571, 572, a status indicator area 580 and an expansion triangle 590. Such an interface 500 is presented to the user when the integrated testing application 315 is launched (e.g., by double clicking on an icon representation of the application).

Generally speaking, the user creates or specifies a test project using the five project manager buttons 510, 520, 530, 540, 550. Each project manager button provides an interface to a specific code manager, or plug-in, of the overall integrated testing application 315. According to exemplary embodiments, the integrated application 315 includes five project managers, including a tool manager, a case manager, a suite manager, a context manager and a report manager, each manager being accessed, for example, via a respective one of the five project manager buttons 510, 520, 530, 540, 550. Exemplary embodiments of the application 315 can also include communications plug-ins and other auxiliary plug-ins (e.g., for polling network traffic) which typically do not correspond to a particular project manager button and which may or may not be accessible by the user via the integrated application interface.

When one of the five directly-accessible managers is opened (e.g., by double clicking on the appropriate manager button), the interface for that manager can be seen by the user (e.g., by pointing and clicking on the expansion triangle 590). Using these manager interfaces, the user can create or specify a desired test project. Thereafter, the user can execute a test project using the three execution control buttons 561, 562, 563. Specifically, the first, second and third control buttons 561, 562, 563 enable the user to stop, start and pause test execution, respectively. Alternatively, the user can specify that text execution should occur at a certain time of day (e.g., during non-business hours in order to avoid overloading network resources). The user can also archive a test project, or certain portions thereof, for use by others.

Figure 6:
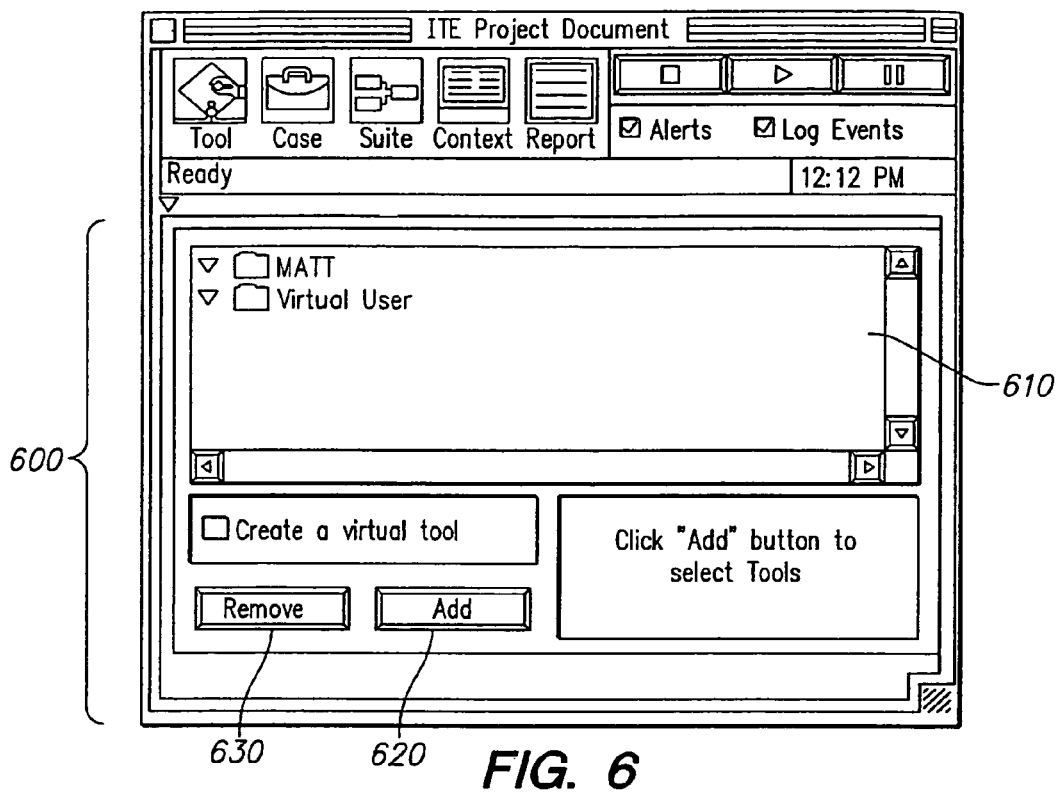
FIG. 6 depicts an exemplary user interface for a tool manager according to the invention.
Figure 7:
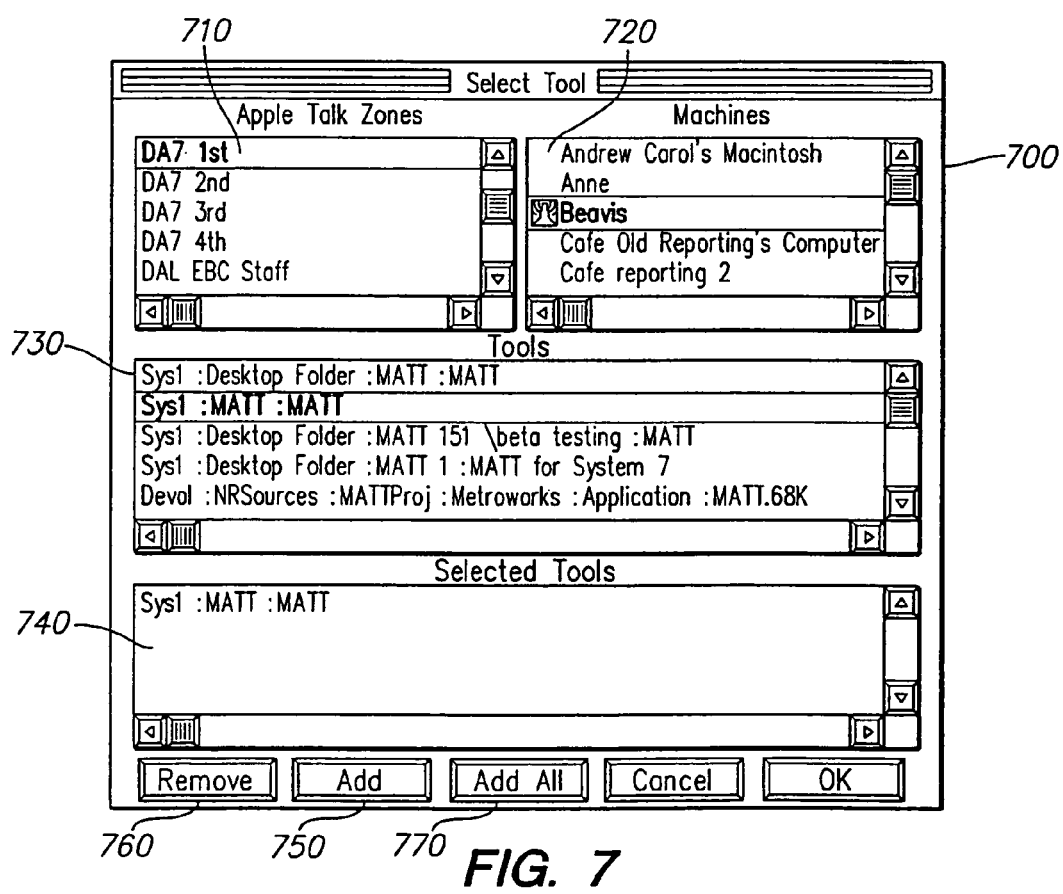
FIG. 7 depicts an exemplary tool selection dialog box according to the invention.

FIG. 6 depicts the exemplary application user interface 500 as it appears when the tool manager has been accessed via the tool manager button 510 and the expansion triangle 590 has been activated to display the tool manager interface 600. As shown, the tool manager interface 600 includes a scrollable region 610, an add button 620 and a remove button 630. A folder for each tool type known to the integrated testing application 315 is displayed to the user in the scrollable region 610 (MATT and VU in the example of FIG. 6). The add and remove buttons 620, 630 permit the user to select and deselect specific tools which are available on the network. Specifically, clicking the add or remove buttons 620, 630 brings up a tool selection window 700 as shown in FIG. 7.

The tools selection window 700 displays zones on the network within a zone region 710 of the window 700, and clicking on a particular zone causes the tool machines of that zone to be displayed within a machine region 720 of the window. Further, clicking on a particular machine causes the tools installed on that machine to be displayed in an available-tools region 730 of the window 700, and clicking on a listed tool highlights the tool so that it can be added or removed from a Selected Tools region 740 of the window 700 (using an add button 750 and a remove button 760, respectively). An add-all button 770 is functional when a particular machine is selected and enables all of the machine's tools to be added to the list simultaneously.

A tools document is a file that contains a particular selected tools list. According to exemplary embodiments, a tools document can be created by dragging the tool manager button 510 to a folder or to the computer display desktop. Advantageously, a list of tools saved during the creation of one test project can be incorporated into another test project (e.g., by dragging the saved tools document onto the tool manager button 510 when the other project is being created). If two test projects are being worked on simultaneously, selected tools can be dragged directly from one to the other, thereby bypassing the computer file system.

A virtual tool is a place-holder for a real tool to fill at a later time. A user can add a virtual tool to allow test project development to proceed, even though the specific tool desired is not yet known. This can be useful when the host machine is temporarily disconnected from the network, when the user is undecided as to which particular tool to use in a given instance, and/or when a user wishes to allow for a new type of tool that is not yet recognized by the integrated testing application. When a test suite containing a virtual tool is executed, the user is asked to select a real tool.

Figure 8:
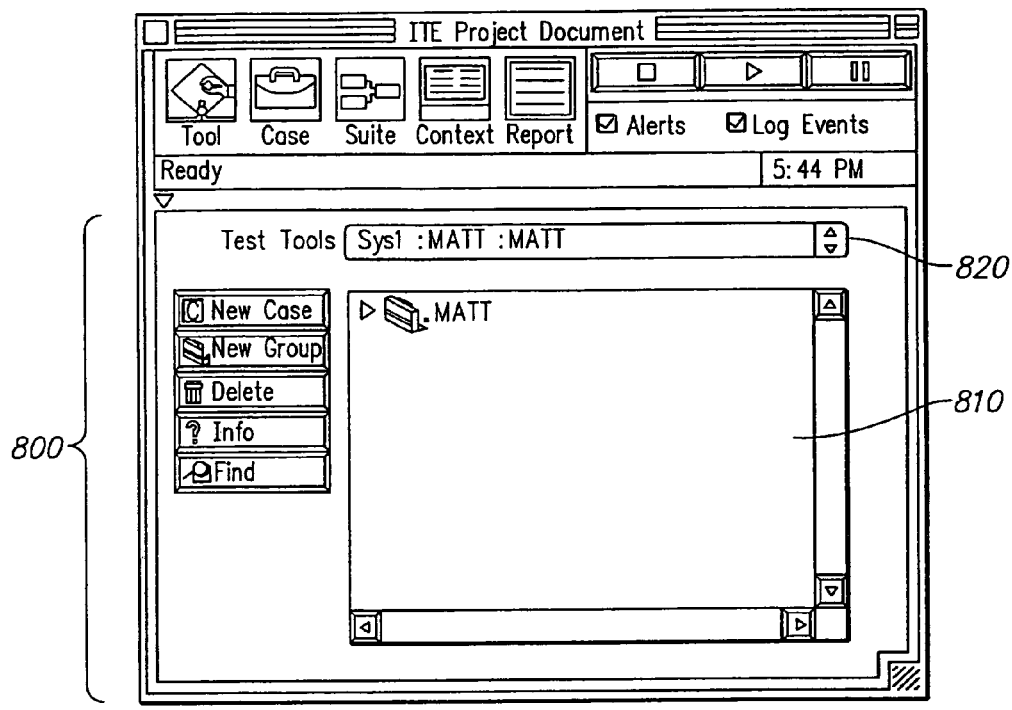
FIG. 8 depicts an exemplary user interface for a case manager according to the invention.

FIG. 8 depicts the exemplary application user interface 500 as it looks when the case manager has been accessed via the case manager button 520 and the expansion triangle 590 has been activated to display the case manager interface 800. The case manager displays lists of available test cases for known tools in a test case region 810 of the case manager interface 800. According to exemplary embodiments, a user chooses from among the tools in the selected tools list using a pop-up menu 820. The available test cases are then displayed in the scrollable test case region 810, and the user is able to select specific test cases for inclusion in a test project. Advantageously, the integrated testing application 315 can direct a known test tool to first catalog every test case available on the tool machine (e.g., the first time an expansion triangle for the known test tool is opened in the test case region 810).

Figure 9:
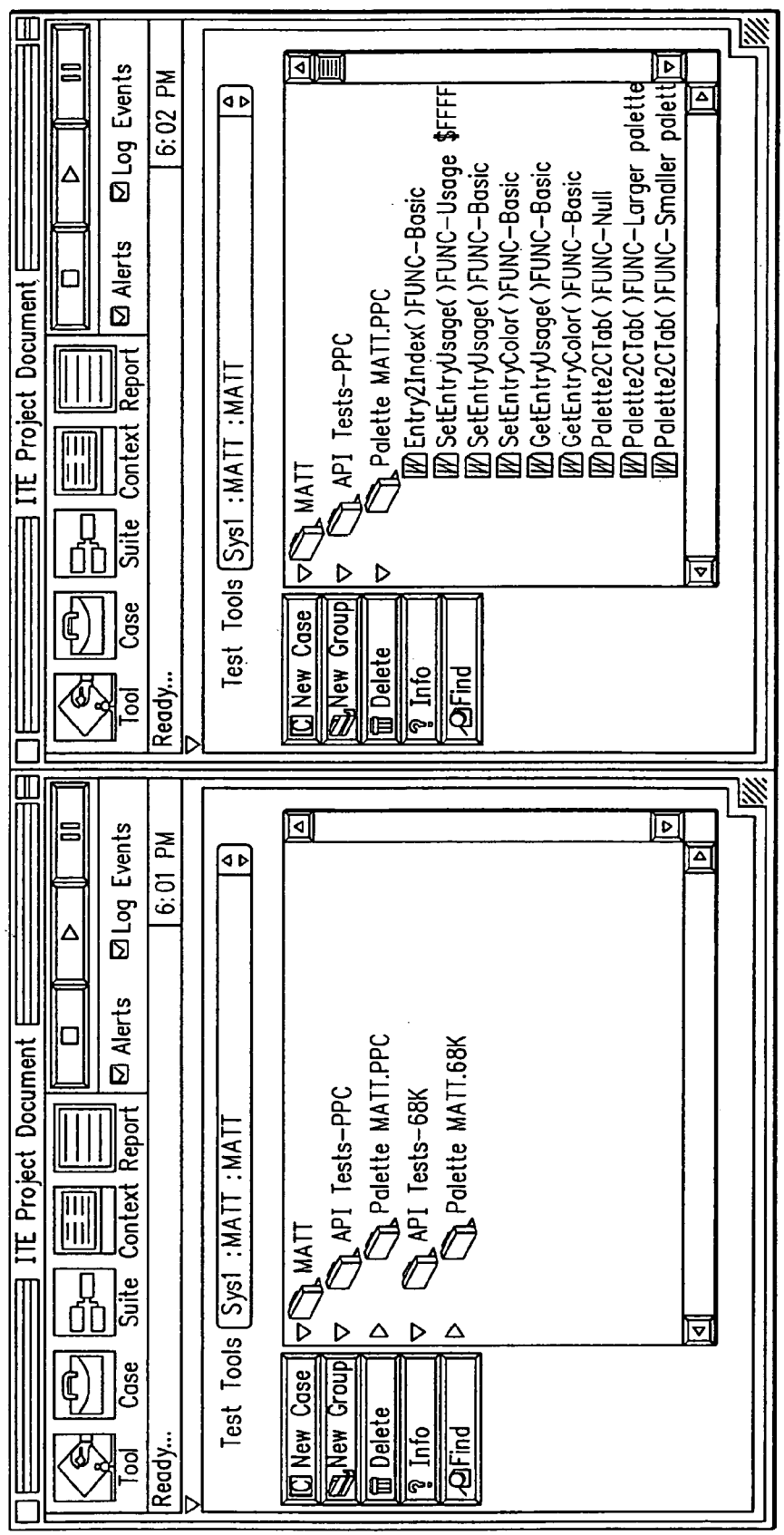
FIG. 9 depicts two alternate views of the exemplary case manager interface of FIG. 8.

Some test tools (e.g., VU and MATT) group test cases in collections of zero or more test cases (or even test case groups) in a manner analogous to a file folder hierarchy. Such test tools thus present available test cases in a hierarchy, wherein a test case group named after the tool itself is usually listed at the top of the hierarchy. Below the topmost group, intermediate test case groups can be listed. Ultimately, actual test cases are presented at the bottom of the hierarchy, and controls are provided which enable the user to create and delete test cases and test case groups as desired. See, for example, FIG. 9, which depicts two views of the case manager interface.

A cases document is a file that contains a list of test cases and corresponding tools list. Advantageously, a user can create a cases document corresponding to a current project, for example by dragging the case manager button 520 to a folder or to the computer desktop. According to exemplary embodiments, doing so creates a cases document file which can then be imported into another test project. For example, the user can drag the document onto the case manager button 520 in another open project. Alternately, if two projects are open simultaneously (e.g., if two versions of the integrated testing application 315 are running concurrently or if two different test projects are open within the same version of the integrated testing application 315), then the user can drag the case manager button 520 from one of the projects to the case manager button 520 for the other project, thereby bypassing the file system.

Figure 10:
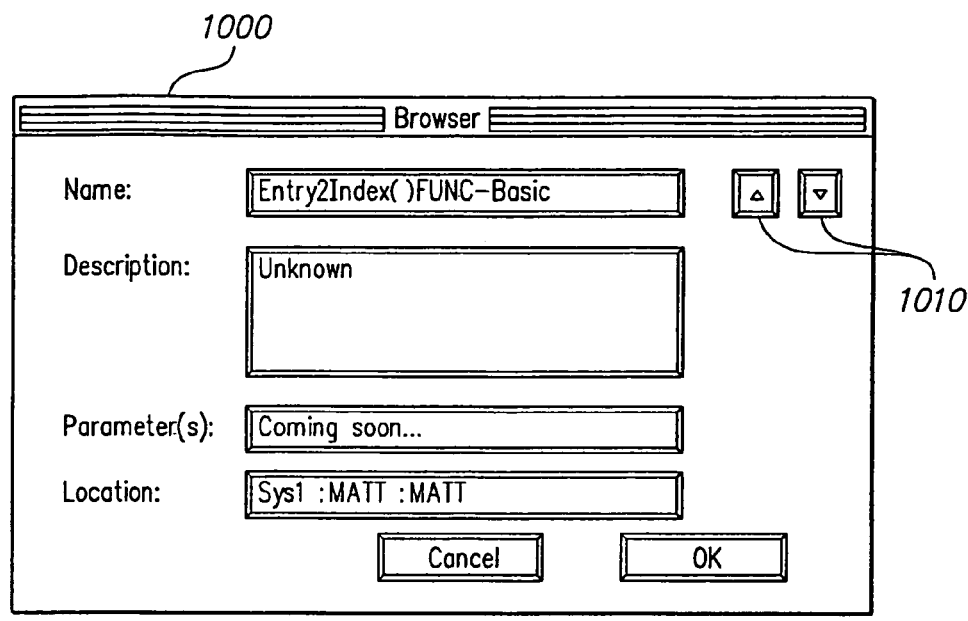
FIG. 10 depicts an exemplary test case browser according to the invention.

According to exemplary embodiments, double-clicking a test case (or selecting a test case or test case group and then pressing an Info button 830 or a Get Info menu command) brings up a dialog box that presents the user with detailed information about the selected item. For example, FIG. 10 depicts an exemplary dialog box 1000 which includes buttons 1010 for navigating to adjacent test cases or test case groups. Further, when test case parameters are implemented by a test tool, the dialog box 1000 provides a view of the test parameters as well.

Figure 11:
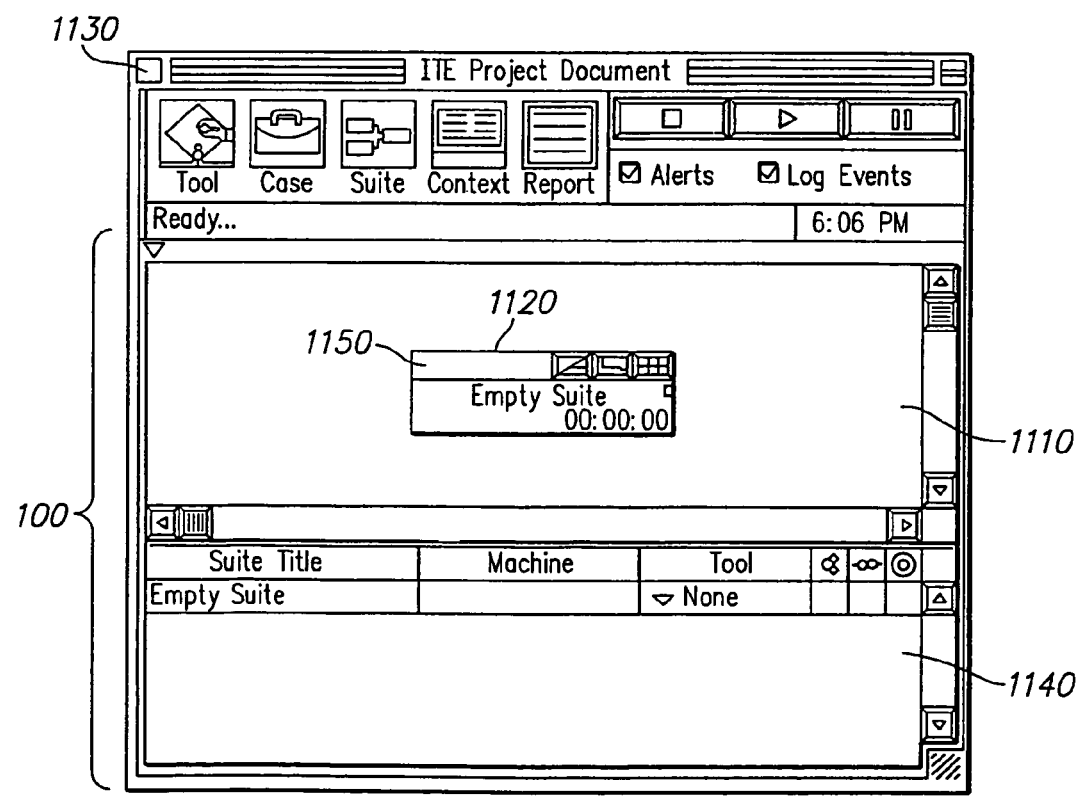
FIG. 11 depicts an exemplary user interface for a suite manager according to the invention.

FIG. 11 depicts the exemplary application user interface 500 as it looks when the suite manager has been accessed via the suite manager button 530 and the expansion triangle 590 has been activated to display the suite manager interface 1100. The suite manager displays, in a middle region 1110, test suites present in a current test project. In FIG. 11, an exemplary new project contains one empty test suite 1120. According to exemplary embodiments, a Create Suite command under a Suite menu (e.g., accessed via a main menu of the integrated testing application or the suite manager) enables the user to create new (initially empty) suites. As shown, a lower region 1140 of the suite manager interface 1100 presents the user with a tabular view of the existing suites. The user can, for example, change the name of an existing suite by clicking once on the displayed suite name in either the middle region 1110 or the lower region 1140. To modify other attributes of an existing suite, the user can, for example, double-click on a gray region 1150 at the top of the suite box 1120. According to exemplary embodiments, doing so brings up a suite window, or test group view, for the suite as described below.

Figure 12:
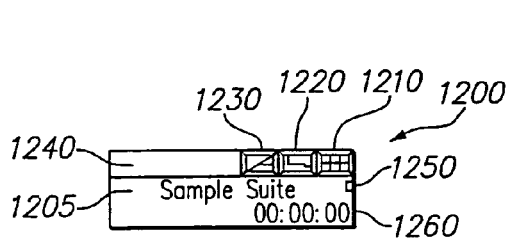
FIG. 12 depicts an exemplary test suite display box according to the invention.
Figure 13:
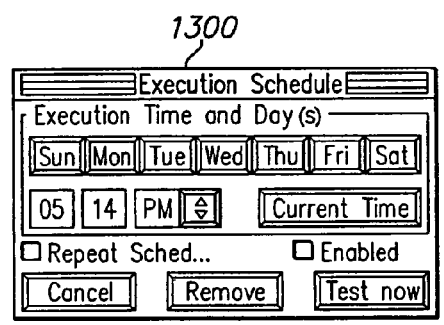
FIG. 13 depicts an exemplary test suite execution schedule dialog box according to the invention.

The suite box 1120 for an existing suite displays and/or provides access to several pieces of information for the suite. An exemplary suite box 1200 is shown in greater detail in FIG. 12. As shown, a name field 1205 displays the name of the suite and can be changed as described above. Additionally, a schedule button 1210 of the suite box 1200 can be used to bring up an execution schedule dialog box for the suite. An exemplary execution schedule box 1300 is depicted in FIG. 13. Advantageously, the user can use the schedule dialog box 1300 to have the suite run by the integrated testing application 315, unattended, at a specified time. Further, a reports button 1220 can be used to bring up a dialog box in which the user can create a report to be associated with the suite (see the description of the report manager below for more details on test reports), and a context button 1230 can be used to bring up a dialog box in which the user can select a context to be associated with the suite (see the description of the context manager below for more details on contexts).

A status field 1240 of the suite box 1200 is initially empty. However, when the test suite is executed, the status field indicates, for example, if the suite is presently running or has already run and passed or failed. A link region 1250 of the suite box 1200 can be used to link the test suite to other test suites (e.g., so that execution of the test suite is dependent upon another test suite in the project or vice versa). An elapsed time field 1260 initially shows zeroes, and then shows elapsed execution time once the test suite is run.

According to exemplary embodiments, a user can delete a test suite from a current test project in the suite view (e.g., by clicking on the corresponding suite box and pressing a delete key of the host machine 310). Alternatively, a user can access and modify a test suite in the suite view (e.g., by double-clicking the gray region 1240 at the top of a test suite box 1200).

Figure 14:
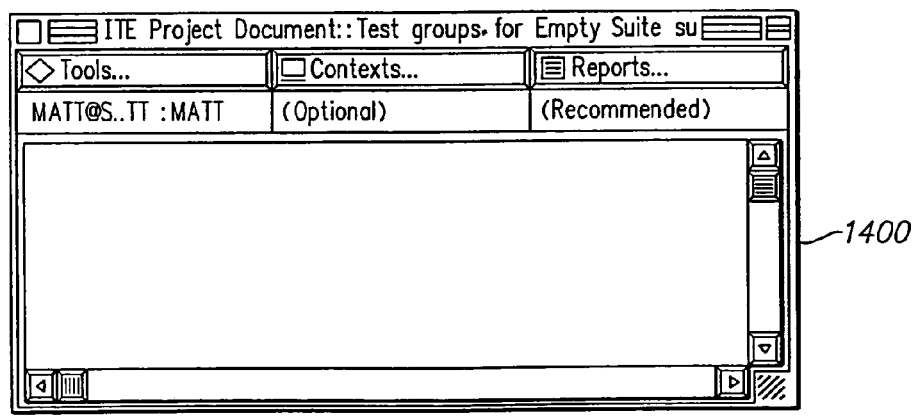
FIGS. 14-15 depict exemplary test group views according to the invention.
Figure 15:
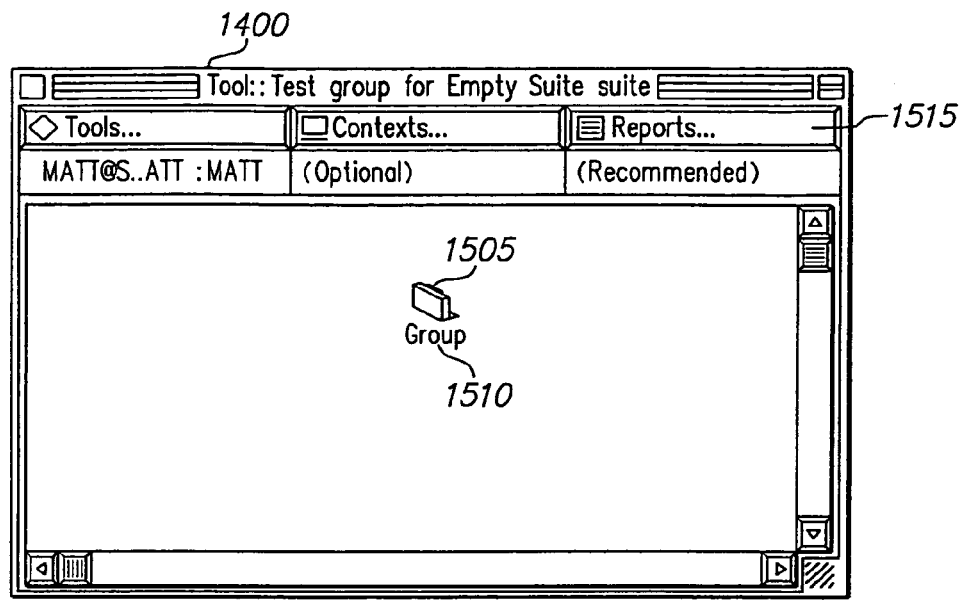

When a test suite is opened, a suite window is displayed. FIG. 14 depicts an exemplary suite window 1400 for an empty test suite. When the suite window 1400 for a test suite is displayed, a Create Test Group command is available to the user (e.g., via a main menu of the suite manager). When a test group is first created, it is given the generic name "Group" as is shown for an exemplary test group 1505 in FIG. 15. The user can then change the name of an existing test group, for example by clicking once on the existing group name 1510.

Figure 16:
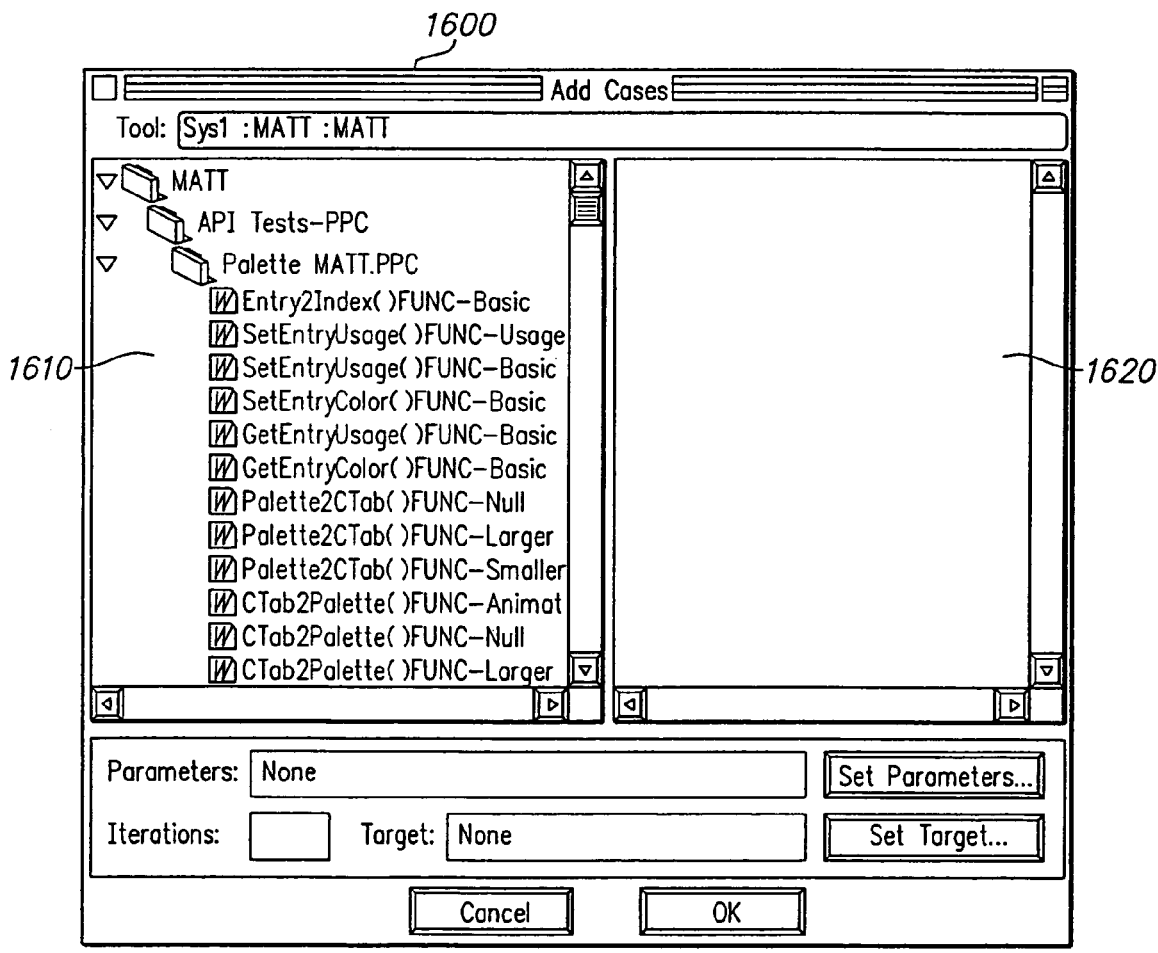
FIG. 16 depicts an exemplary user interface for a test case manager according to the invention.

Advantageously, a user can add test cases to an existing test group, for example by double clicking on the test group icon 1505. According to exemplary embodiments, doing so brings up an Add Cases dialog box 1600 as shown in FIG. 16. In the exemplary Add Cases dialog box 1600, test tools associated with the test suite (and their corresponding test cases and test case groups) are shown in a left region 1610, and test cases and test case groups are added to the test group, for example by being dragged from the left region 1610 to a right region 1620.

Figure 17:
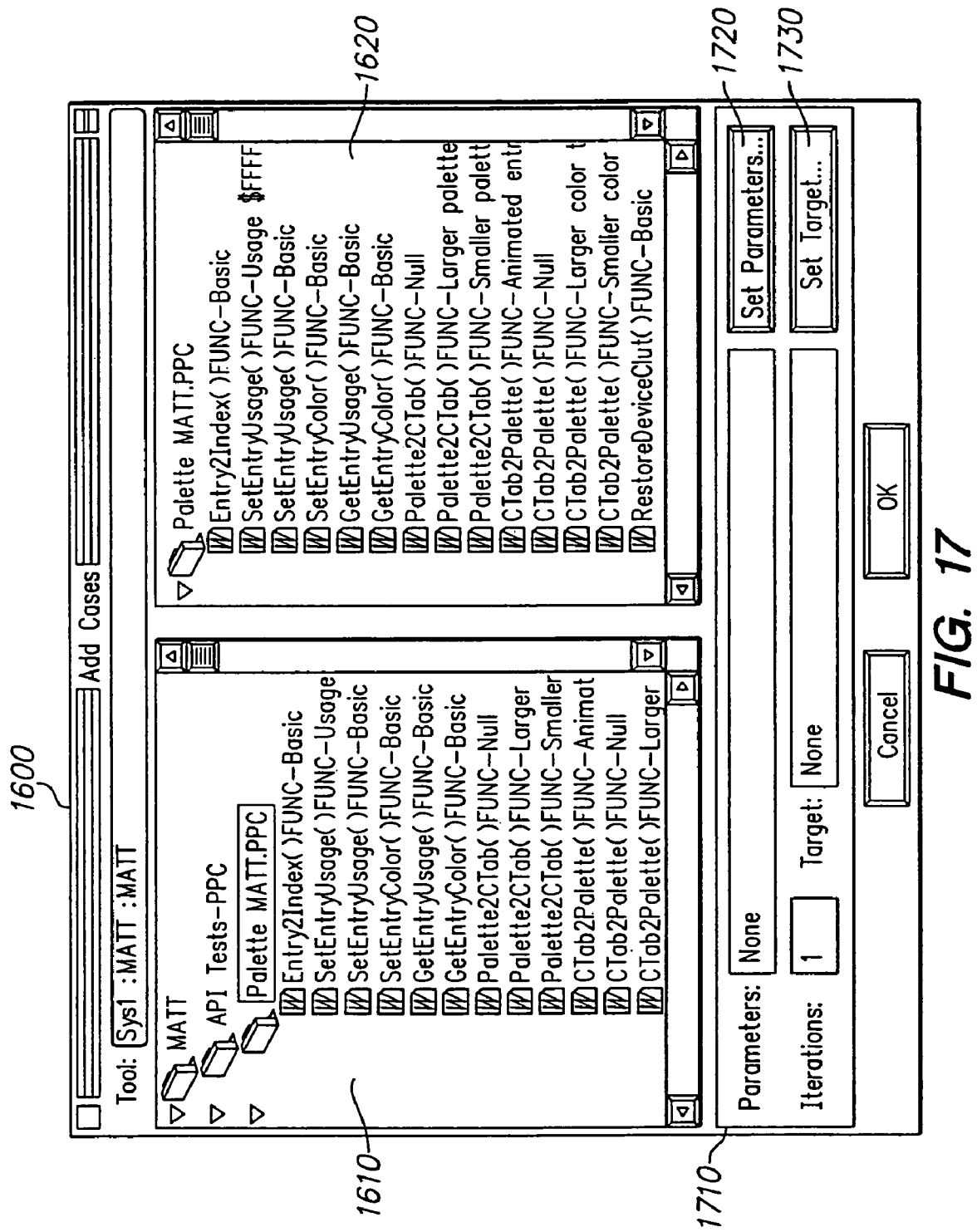
FIG. 17 depicts an alternate view of the exemplary test case manager interface of FIG. 16.

An example list of selected cases is shown in FIG. 17. Using the Add Cases dialog box 1600, a user can reorder the listed test cases and test case groups in the right region 1620, for example by selecting and dragging them up or down as desired. Further, double-clicking a test case in either region 1610, 1620 brings up the test case browser dialog described above with respect to the exemplary case manager. A user can also remove test cases and test case groups from the right-hand region 1620, for example by selecting a test case or test group and depressing the delete key.

According to exemplary embodiments, parameters, iterations and targets associated with a test case are displayed in a bottom region 1710 of the Add Cases dialog box 1600 when the test case is selected in the right region 1620. The user can thus add or modify parameters for a test case or set a target for a test case, for example by selecting a test case and then clicking a Set Parameters button 1720 or a Set Target button 1730 as desired. Doing so brings up an appropriate dialog box.

A suites document is a file that contains a group of test suites and the corresponding test cases, tools, contexts and reports. Advantageously, a user can create a suites document corresponding to the current test project, for example by dragging the suite manager button 530 to a folder or to the computer desktop. Once a suites document has been saved, a user can then import the list of suites, test cases, tools, contexts and reports into another test project. For example, the suites document can be dragged onto the suites manager button 530 for an active test project. Alternatively, if two test projects are active simultaneously, then the user can drag directly from the suite manager button 530 of one of the projects to the suite manager button 540 of the other project, thereby bypassing the file system altogether.

In a test project with multiple test suites, considerable control over suite execution can be exercised through the use of links according to the invention. For example, using the suite manager view, a user can graphically manipulate test suites and link them in combinations of sequences and parallel groups. The linking process is generally carried out by creating the desired test suites, arranging the created suites on the screen by clicking and dragging, and then linking the suites together by pointing and clicking on the link regions of the test suites. For example, to link a first test suite to a second test suite, the user can click on the link region of the first test suite and then drag to the second suite. Doing so provides a visible link between the test suites, and the user can, for example, click on the end of the link nearest the second test suite to indicate the type of link desired.

Figure 18:
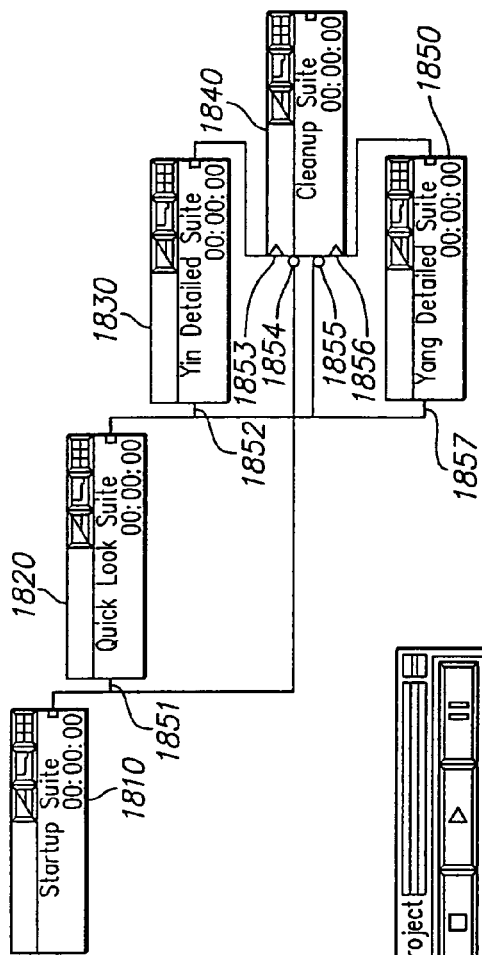
FIG. 18 depicts an exemplary set of test suite links according to the invention.

FIG. 18 depicts an exemplary set of linked test suites, wherein a shape at the end of a link indicates the link type. As shown, there are five test suites 1810, 1820, 1830, 1840, 1850 and seven associated test links 1851-1857. In FIG. 18, a solid circle at the end of a test link indicates a Run on Success link, a hollow circle indicates a Run on Failure link, a solid arrow indicates a Run Always link, and an open-circuit symbol indicates a Run Never link. Thus, in FIG. 18, if the Startup suite 1810 passes, it will be followed by the Quick Look suite 1820. Otherwise, it will be followed by the Cleanup suite 1840. Further, if the Quick Look suite 1820 passes, it will be followed by the Yin Detailed suite 1830 and the Yang Detailed suite 1850 running in parallel. However, if the Quick Look suite 1820 fails, it will be followed by the Cleanup suite 1840. Regardless of whether the Detailed suites 1830, 1850 pass or fail, the last one to complete will be followed by the Cleanup suite 1840. Advantageously, test groups within a test suite can be linked in a similar fashion. According to exemplary embodiments, the user interface and linking semantics for test groups are similar to those described above for linking test suites.

As noted above, controls for running test suites are always visible in the upper right corner of the main user interface window 500. For user convenience, equivalent Stop, Run and Pause commands are provided under a suite menu (accessed, for example, via a main menu of the suite menu). When no suites are selected, the Run control executes all the test suites in a project according to the logic implied by the test links. However, if one or more suites are selected, the Run control runs the selected suites regardless of the links. In exemplary embodiments, the status field 1240 for a test suite displays either "Ready", "Running", "Passed" or "Failed", and the background color of the suite box 120 changes as the test execution progresses.

Advantageously, contexts can be specified for suites and test groups. A context is a description of the minimum hardware and software requirements for execution of a test suite. For example, a context can specify that a particular operating system revision number and/or a specific amount of random access memory is/are required to execute a particular test suite. According to exemplary embodiments, a context can be specified by accessing a context dialog box, for example by depressing the context manager button 540 on the main interface window 500 or by depressing the context button 1230 directly on a suite box 1200.

Additionally, test reports can be added for a test suite or test group using a report dialog box. The report dialog box can be accessed, for example, by clicking on the report button 1220 on a suite box 1200 or by clicking on a reports button 1515 on a suites window 1400 (see FIG. 15). The report manager (accessed via the report manager button 550 in the main interface window 500) then provides a report box for each suite in a current test project for which a report has been specified.

Figure 20:
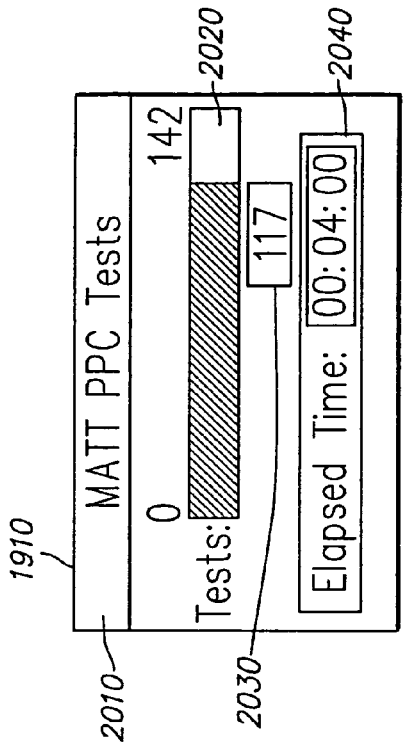
FIG. 20 depicts an exemplary test report display according to the invention.
Figure 19:
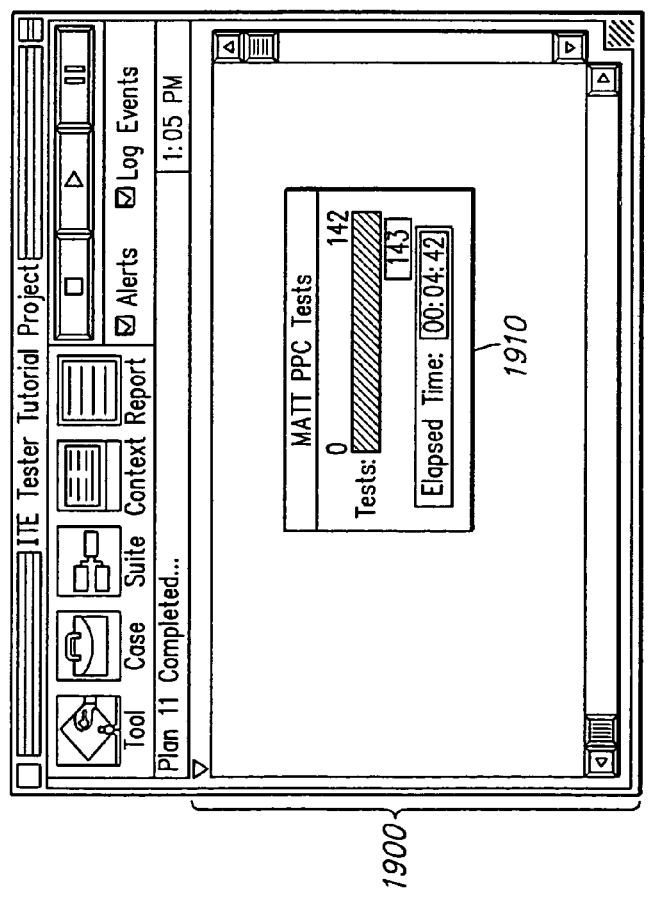
FIG. 19 depicts an exemplary user interface for a test report manager according to the invention.

FIG. 19 depicts the exemplary application user interface 500 as it looks when the report manager has been accessed via the report manager button 550 and the expansion triangle 590 has been activated to display the report manager interface 1900. In FIG. 19, the report manager display 1900 includes a test suite report 1910 for a previously executed test suite. FIG. 20 depicts the test suite report 1910 as it might look during test suite execution. As shown, the exemplary suite report 1910 includes a report name field 2010, a graphical test case progress indicator 2020, a number of test cases completed field 2030 and an elapsed time (i.e., since the suite started running) field 2040.

Figure 21:
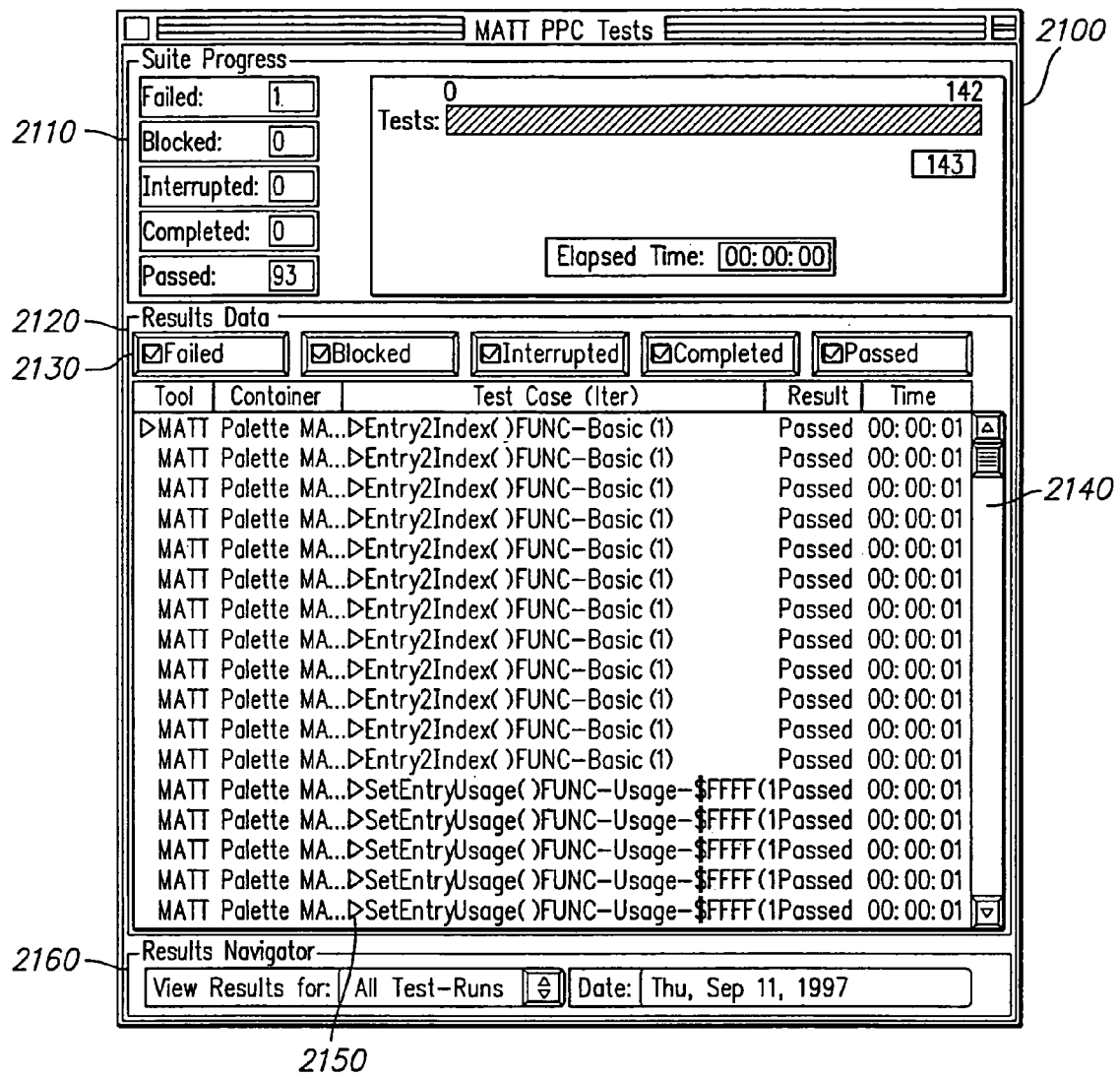
FIG. 21 depicts an exemplary test report browser according to the invention.

According to exemplary embodiments, double-clicking a report box (even when the corresponding test suite is still running) brings up a report browsing window 2100 as shown in FIG. 21. A Suite Progress region 2110 of the report browsing window 2100 provides a summary of the results for the test suite. Additionally, a Results Data region 2120 contains a set of check boxes 2130 for filtering the test results, and a scrollable region 2140 containing all test results which pass through the filtration. Since the messages produced by each test case can span several lines, each line can be viewed using a corresponding expansion triangle 2150. In exemplary embodiments, the messages change color to indicate result completion status. Further, a Results Navigator region 2160 contains a pop-up menu that allows the user to access results from specific runs of the current test suite.

According to the invention, a File Menu can be incorporated within the integrated testing application 315 to provide the user with standard commands for creating, opening, closing, saving and printing various items. The File Menu can be accessible, for example, via a main or tool bar menu of the integrated testing application. In exemplary embodiments, an "Open Log" command brings up a window that permits the user to browse text messages created by the integrated testing application 315 in response to certain events. For example, events such as launching the integrated testing application 315, opening a test project, running a test case and getting an error message can be logged along with a corresponding date and time. The "Log Events" check box 572 on the main window 500 controls whether log messages are stored.

Figure 22:
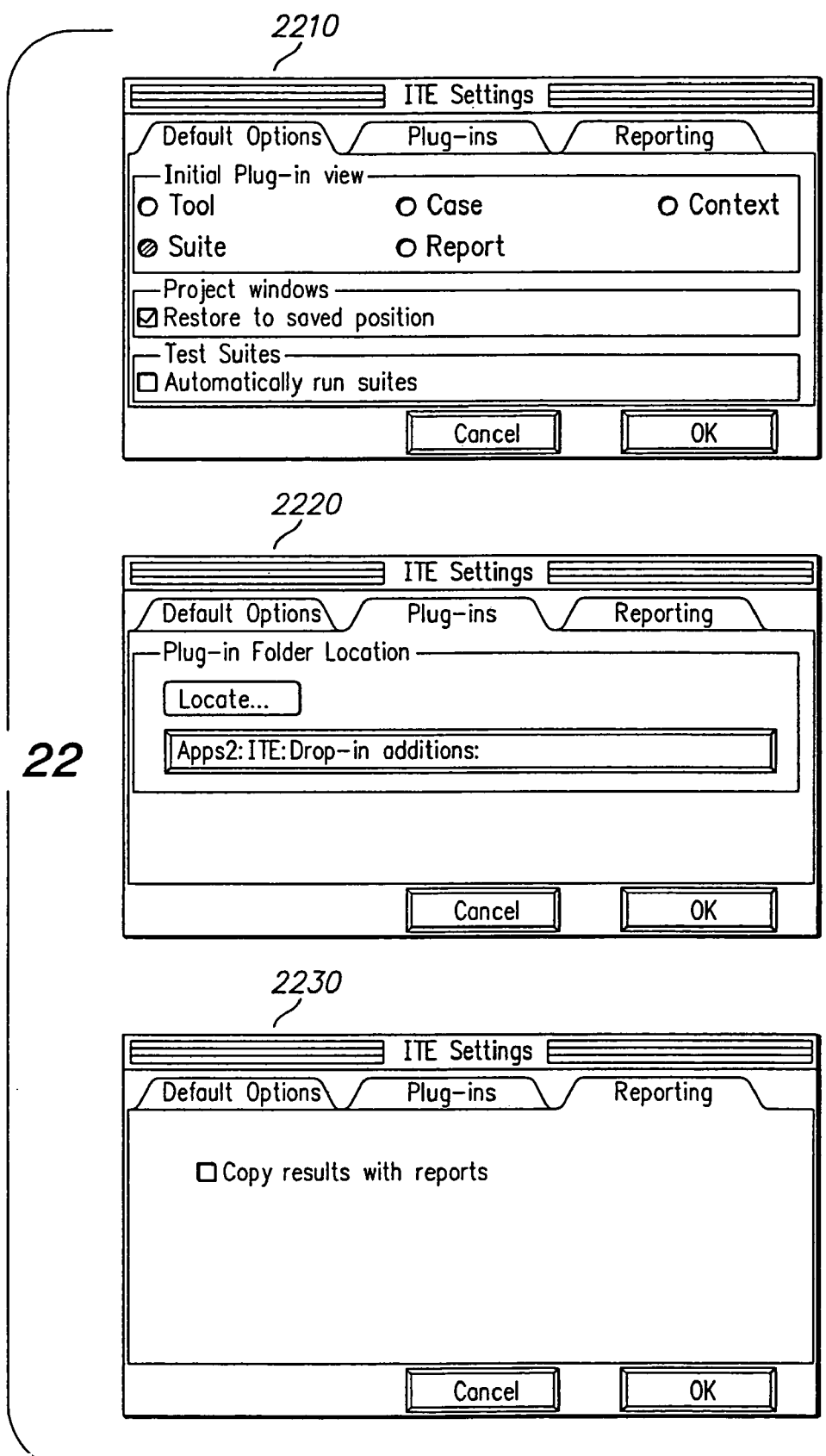
FIG. 22 depicts an exemplary user preferences dialog box according to the invention.

A "Preferences" command allows a user to specify three groups of preferences in exemplary embodiments of the integrated testing application 315. The three groups of preferences include Default, Plug-in and Report preferences. FIG. 22 depicts three views 2210, 2220, 2230 of an exemplary preferences dialog box according to the invention, wherein each view permits the user to set options for one of the Default, Plug-in and Reports preferences groups. In exemplary embodiments, the Default preferences group includes an initial plug-in view option (i.e., to permit the user to specify which of the five manager displays is initially presented upon application launch), a restore to saved position option (i.e., if this box is checked, the integrated testing application 315 remembers and restores the screen position of the main window 500 when the application is launched and otherwise opens the window 500 in a fixed area of the computer display device) and an automatically run suites option (i.e., if this box is checked, the integrated testing application 315 runs the test suites in a project as soon as the test project is opened). The Plug-In preferences group includes a plug-in folder location option (i.e., to permit the user to specify a location where the integrated testing application 315 looks for plug-ins when it is launched), and the Reporting preferences groups includes a copy results with reports option (i.e., if this box is checked, dragging a reports document from one open test project to another open test project or to the computer file system will include test results—which can be large).

The power and flexibility of the exemplary integrated testing application 315 described above is due in significant part to the underlying architecture of the application itself. Generally speaking, exemplary architectures according to the invention correspond roughly to the layout of the above described user interface. In other words, exemplary integrated applications according to the invention include a central, or core application in communication with independent plug-in modules (e.g., one plug-in module for each of the above described tool, case, suite, context and report functions and separate plug-in modules for communications and auxiliary functions). Advantageously, plug-in modules according to the invention are independent from one another, and revised or customized plug-ins can thus be easily incorporated. Further, information maintained by each plug-in is independent of information maintained by other plug-ins. As a result, sections of a test description can be separately archived and easily shared among users.

An exemplary architecture according to the invention is described by way of the several Unified Modeling Language (UML) diagrams shown in FIGS. 23-27. The exemplary architecture is founded on the well known PowerPlant® Application Framework supplied by Metrowerks®. In FIGS. 23-27, a naming convention is used to indicate the origin of each depicted class. Specifically, all classes having a name beginning with the letter "L" are supplied by the PowerPlant Framework, while all classes having a name beginning with the letter "C" are custom-made classes unique to the integrated testing application of the invention.

Figure 23:
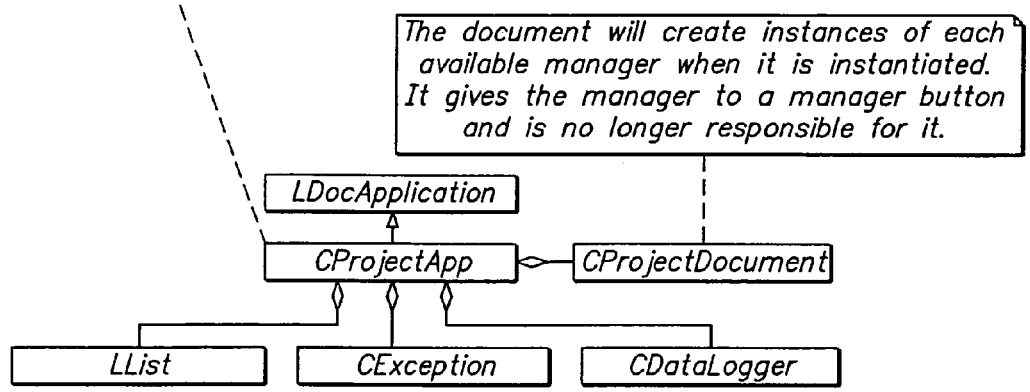
FIG. 23 is a Unified Modeling Language (UML) diagram for an exemplary integrated testing application according to the invention.

FIG. 23 depicts an exemplary high-level structure of an integrated testing application according to the invention. As shown, the exemplary application comprises several classes, including an LDocApplication class, a CProjectApplication class, a CProjectDocument class, an LList class, a CException class and a CDataLogger class. The CProjectApp class embodies the application functionality of the exemplary integrated testing application and publically inherits from the LDocApplication class. The CProjectApp class therefore includes all the behavior of the base class and has the additional ability to locate and load integrated testing application plug-ins.

The CProjectApp class can also manage communications between the integrated testing application and the various plug-ins, as well as communications between the plug-ins themselves. According to exemplary embodiments, the CProjectApp class creates and manages project documents, the functionality and data of which are handled by the CProjectDocument class. When instantiated, for example, each project document creates it's own instances of the available plug-ins. The plug-in managers are then attached to corresponding manager buttons (see the description of Component Controls below).

The CProjectDocument class makes use of the CException class for handling errors that occur during the course of program execution. Additionally, the CProjectDocument class makes use of the CDataLogger class for writing to a log file when status information is being displayed in a document or when an exception is thrown. The CProjectDocument class also has and manages a list (LList) of available plug-ins found at launch time.

Figure 24:
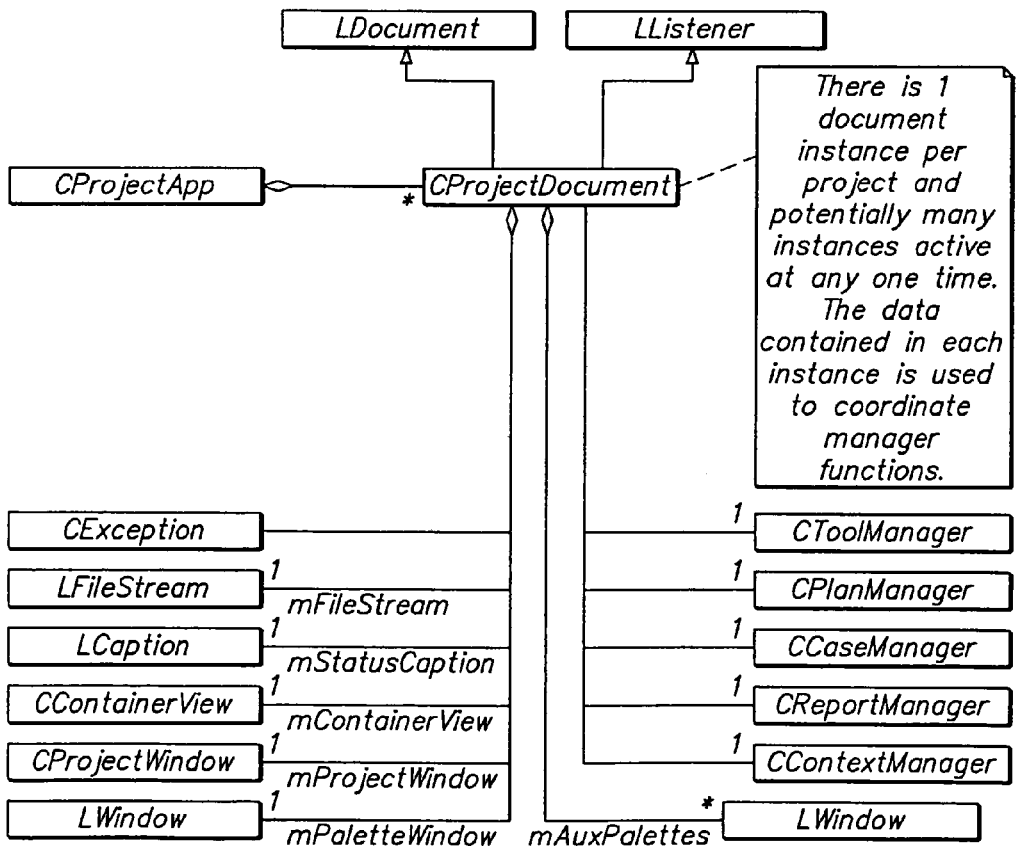
FIG. 24 is a UML diagram of an exemplary project document class in an integrated testing application according to the invention.

FIG. 24 depicts the structure of an exemplary project document class according to the invention (i.e., CprojectDocument). The CProjectDocument class is instantiated, for example, when a new test project is created by the integrated testing application. The CProjectDocument class inherits from LDocument and therefore retains all of the behavior of the base class with the added ability to manage it's own integrated application plug-in instances. The CProjectDocuemnt class can also display status information to the user and effectively provide the window through which each integrated application plug-in can implement its graphical user interface. According to exemplary embodiments, each CProjectDocument object has a list of instances of available managers and is able to handle switching between them when the user clicks on the manager buttons at the top of a document window.

The CProjectDocument class also inherits from Llistener, which provides it with messaging capabilities. Like the CProjectApp class, the CProjectDocument class also makes use of the CException class to handle errors. Further, the CProjectDocument class has a file stream data member (LFileStream) which is used to read and write data from the file in which the document is saved, a status caption data member (LCaption) which is used to display status information for the user, a container view data member (CcontainerView) which is used to internally manage view specifics, a project window data member (CProjectWindow) which is the window into which each plug-in instance draws its interface elements, and a palette window data member (LWindow) which can include a reference to an optional palette used by any integrated testing application plug-in. The CProjectDocument class can also include an auxiliary palettes data member which lists auxiliary palettes created by auxiliary plug-ins.

Figure 25:
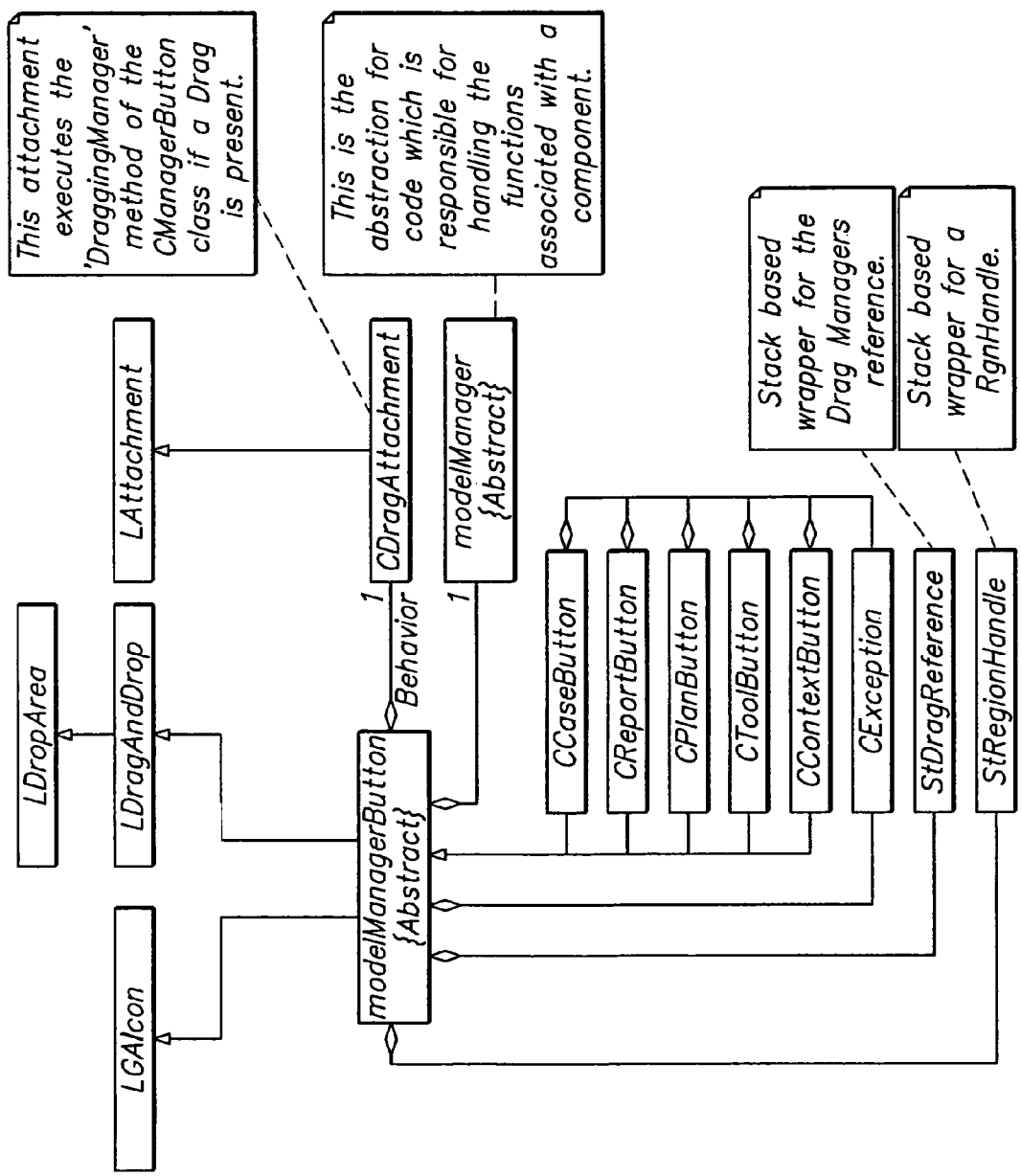
FIG. 25 is a UML diagram of exemplary manager control icons in an integrated testing application according to the invention.

FIG. 25 depicts an exemplary structure for manager control icons (i.e., buttons) according to the invention. Each CProjectDocument instance is, for example, a listener to the group of plug-in buttons at the top of it's window. The base class for any button (i.e., modelManagerButton) publically inherits from LGAIconButton for its button behavior and LDragAndDrop for it's drag and drop functionality. According to exemplary embodiments, the modelManagerButton class is an abstract class and therefore cannot exist on its own, and must be a base class. As described above, there are typically five manager button classes which inherit from modelManagerButton. As shown, the five manager button classes include CCaseButton, CReportButton, CPlanButton, CToolButton, and CContextButton. Each of these classes makes use of the CException class for handling errors.

The modelManager class is the base class for an instance of an integrated application plug-in's manager. This object is tied to a modelManagerButton by its interface specified by the modelManager class. The modelManager class is also abstract and can only be subclassed. The manager is called to supply or receive data associated with a drag or drop on a manager button when one occurs. The modelManagerButton class makes use of the StDragReference and StRegionHandle classes for stack based management of drag references and regions used to draw the button outlines during a drag operation. Further, the modelManagerButton class makes use of the CDragAttachment attachment which executes the 'DraggingManager' method of the CManagerButton class in the event of a drag.

Figure 26:
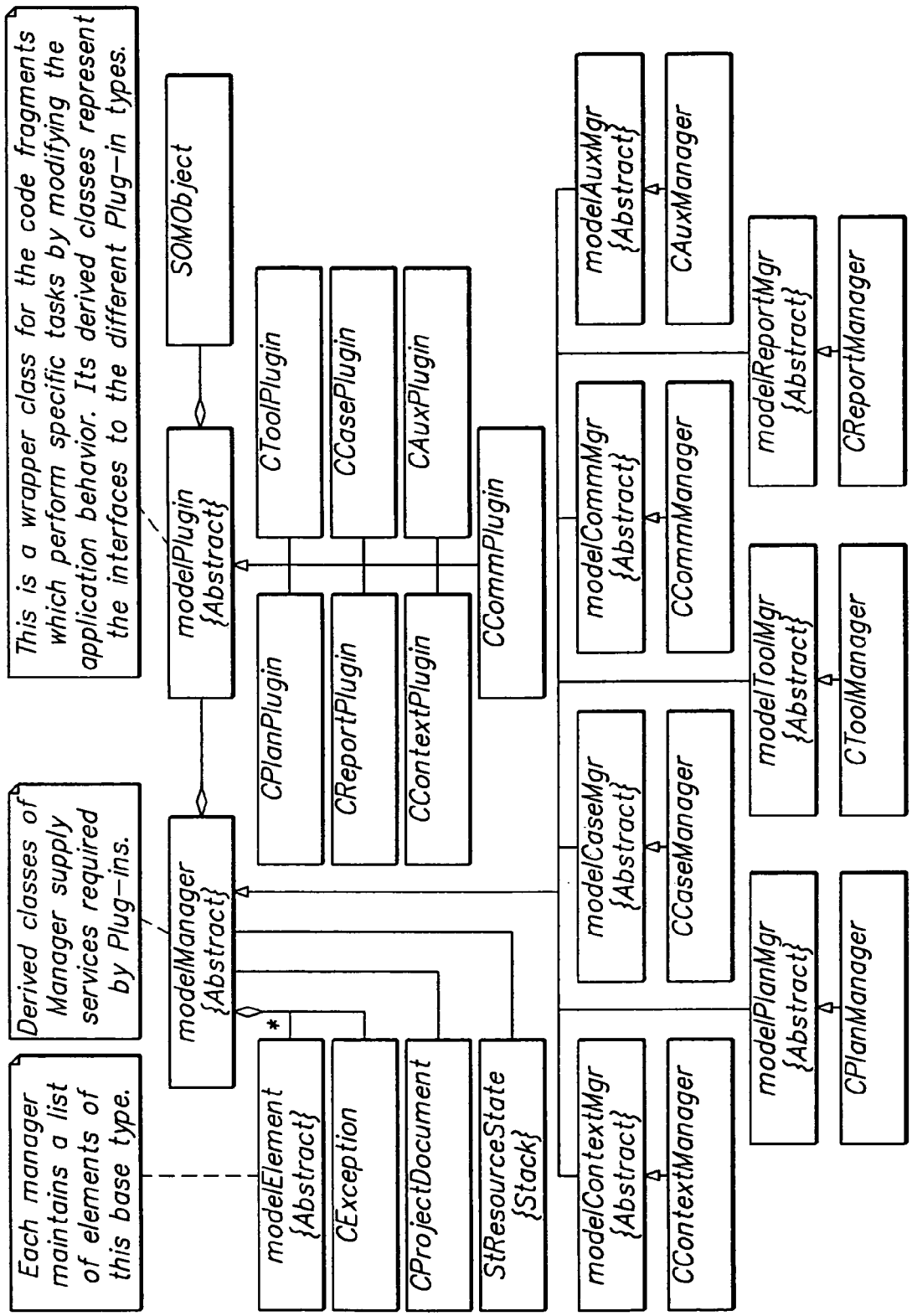
FIG. 26 is a UML diagram of exemplary plug-in managers and wrappers in an integrated testing application according to the invention.

FIG. 26 depicts an exemplary structure for plug-in managers and wrappers according to the invention. The modelManager class is an abstract class that specifies the services required, and common functionality, of any given integrated application plug-in. According to exemplary embodiments, all integrated application plug-ins derive from this base class and implement the methods specified. Each instance of an integrated application plug-in maintains a list of elements (modelElement) created by each loaded plug-in. These elements are plug-in specific pieces of data and represent the division of functionality for each particular plug-in. The modelElement class is an abstract class that defines the minimum required behavior for an element of these lists. The modelManager class makes use of the CException class for managing errors as they occur, and the stack based StResourceState class to efficiently manage switching between resource forks for the plug-ins. Additionally, the modelManager class has a CProjectDocument data member which is used as a link to the project document that is associated with a particular plug-in manager instance.

According to exemplary embodiments, there are seven model manager classes that derive from modelManger, including modelContextMgr, modelCaseMgr, modelCommMgr, modelAuxMgr, modelPlanMgr, modelToolMgr, and modelReportMgr. Each of these classes is abstract and specifies the services required by a given plug-in that are to be implemented and available to other plug-ins in the integrated testing application. There are seven manager classes which derive from the seven modelManger classes, including CContextManager, CCaseManager, CCommManager, CAuxManager, CPlanManager, CToolManager and CReportManager. These classes implement the required interface specified by their corresponding modelManager class and also form the interface between a plug-in and its manager. When an integrated application plug-in needs to communicate with the integrated application or another plug-in, the plug-in calls through that plug-in's manager. According to the invention, these interfaces are well defined and are adhered to as they form the basis of plug-in to integrated application communication.

The modelPlugin class is an abstract class which defines the required behavior for and is the base class for all integrated application plug-ins. The methods of this class are those called by the integrated testing application to handle such actions as drag and drop and saving or restoring plug-in data. There are seven plug-in classes which derive from modelPlugin, including CPlanPlugin, CToolPlugin, CReportPlugin, CCasePlugin, CContextPlugin, CAuxPlugin and CCommPlugin. These classes define plug-in specific services and extend them to other instantiated plug-ins. When calling these plug-in methods, the integrated testing application can, for example, make use of the System Object Model for MacOS (SOM) which allows for the plug-ins to be developed with great independence.

Figure 27:
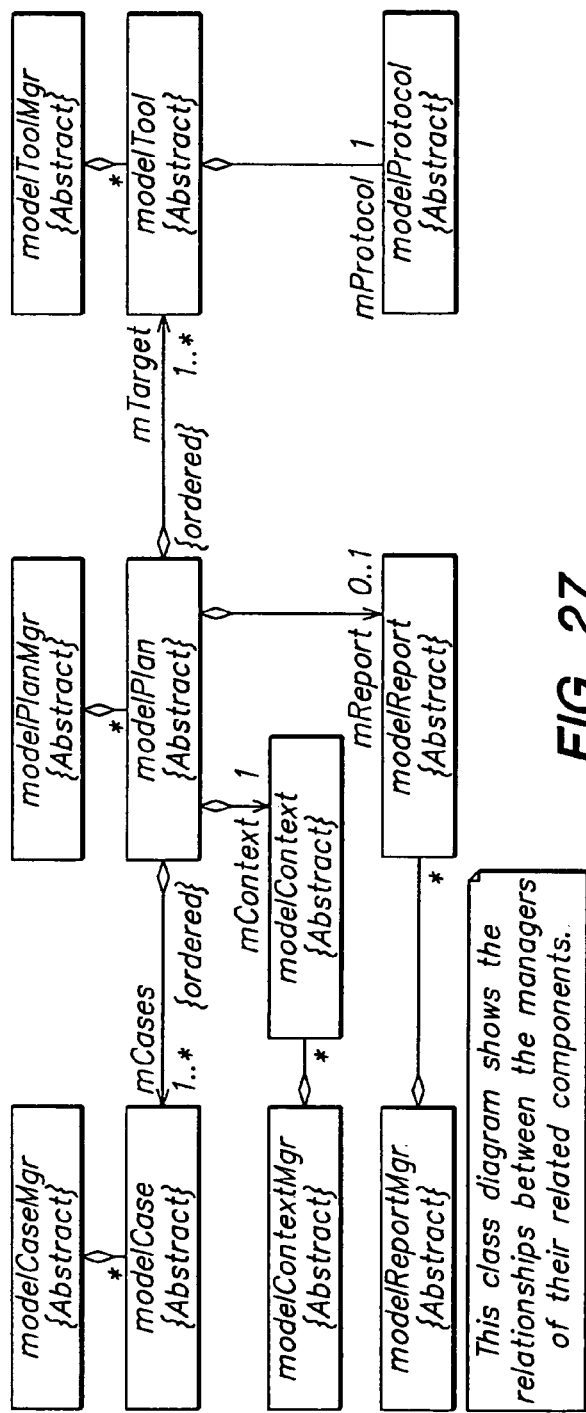
FIG. 27 is a UML diagram of exemplary code manager models and associations in an integrated testing application according to the invention.

FIG. 27 depicts exemplary relationships between the plug-in managers and their specific integrated testing application components. Generally, the suite manager ties in the functionality of each of the plug-ins in order to manage its own data elements and function correctly. The modelCaseMgr class is responsible for managing lists of test cases data which are in turn stored in a data member of the suite or plan. The modelToolMgr class is responsible for managing tool data and their is a data member of the plan which holds a reference to the tool which is to run the test cases in the plan. The modelContextMgr class manages lists of contexts which represent the minimum requirements for executing a certain suite. The suite can have a reference to one of these contexts, and a suite can have a reference to a report which is the CReport class that inherits from modelReport.

As noted above, each plug-in module adheres to a minimum standard or requirements description according to the invention. Exemplary minimum requirements for the various plug-ins are described in detail by way of a series of SOM object headers provided in the attached Appendix A. Those skilled in the art will appreciate that the SOM headers are provided by way of illustration and that any equivalent requirements description can be used to implement the integrated testing and task management systems according to the invention.

The strength of an integrated testing application according to the invention is also due in significant part to the way in which the application communicates with available test tools. According to the invention, the test tools are configured to conform to a predefined communications protocol. As a result, an integrated testing application can interact with each test tool in a consistent manner and can thereby provide the above described features and advantages.

According to exemplary embodiments, test tools in an integrated system adhere to a protocol known as the AppleEvent Test Tool Suite (TTS). The Test Tool Suite defines how test tools are controlled, how test cases are organized, and how test results are represented. In addition to the well known AppleEvent Core and Required Suites (documentation for which is provided, for example, in Apple, Inc.'s Inside Macintosh, Inter-Application Communication Volume), the Test Tool Suite includes several extensions which are suitable for the control and interaction of test tools. A detailed description of the Test Tool Suite is provided in the attached Appendix B. Those skilled in the art will appreciate that the Test Tool Suite is provided by way of illustration and that any suitable protocol can be used to implement the integrated testing and task management systems according to the invention.

To highlight and further understanding of various features of the invention, two sample user sessions with the above described exemplary integrated testing application are provided hereinafter. The first sample user session is from the perspective of an application tester or developer (i.e., from the perspective of an individual interested in using one or more predefined test projects to test an application under development), while the second sample user session is from the perspective of a test developer (i.e., from the perspective of an individual interested in creating one or more test projects).

As described above, an integrated testing application according to the invention can be used (e.g., by an application developer or application tester) to run test projects which have been previously created (e.g., by an application test developer). To do so, the user opens an existing test project file, browses the test suites contained in the test project file, runs the test suites in the test project file and browses the test results.

Figure 28:
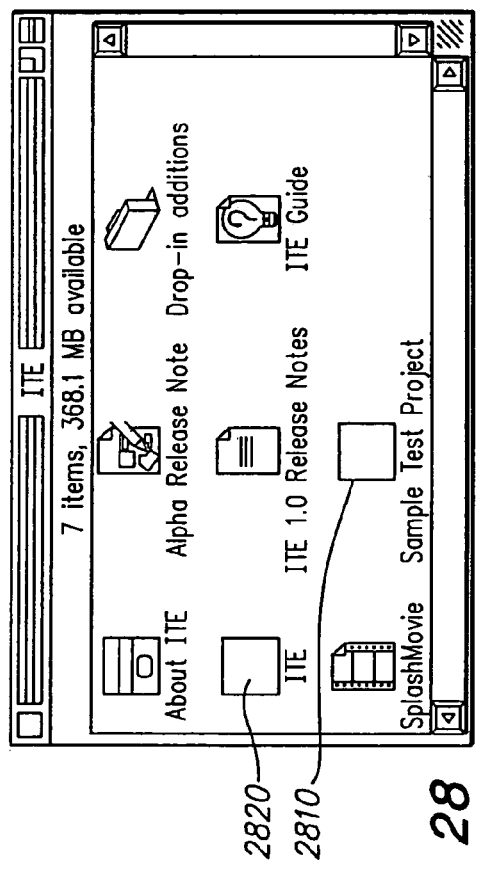
FIGS. 28-32 are exemplary displays provided by an integrated testing application according to the invention when the application is used for testing.
Figure 29:
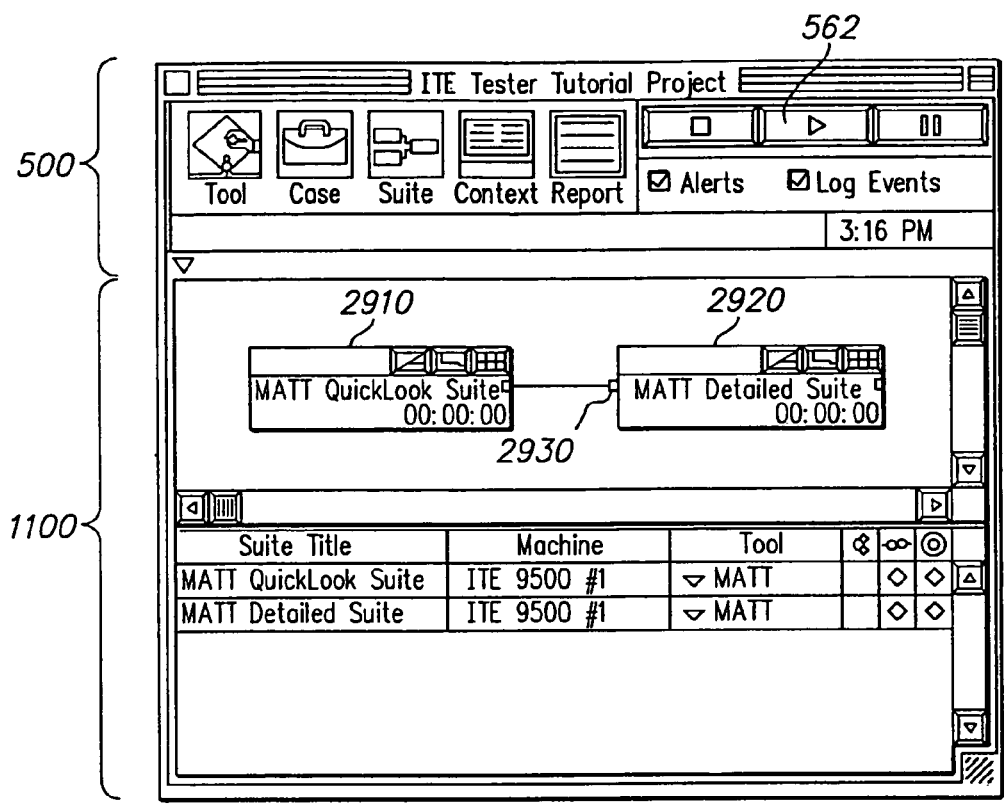

According to exemplary embodiments, the user launches the integrated testing application by double-clicking on an icon corresponding to the existing test project file (e.g., the sample Tester Tutorial Project 2810 icon shown in the exemplary file manager window 2800 of FIG. 28). After doing so, the user sees the integrated application user interface as shown in FIG. 29. In FIG. 29, the main user interface 500 and the suite manager interface 1100 are visible, and the sample test project is seen to include two test suites 2910, 2920 linked by a Run on Success test link 2930 (indicating that the second Detailed Suite 2920 will run only when the first Quick Look Suite 2910 completes successfully.

Figure 30:
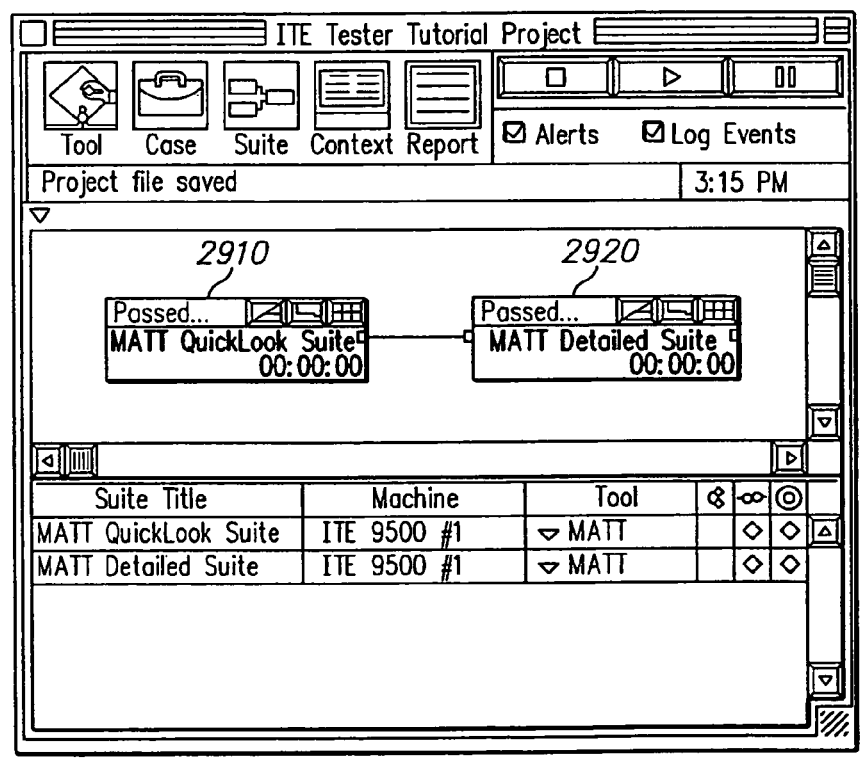
Figure 31:
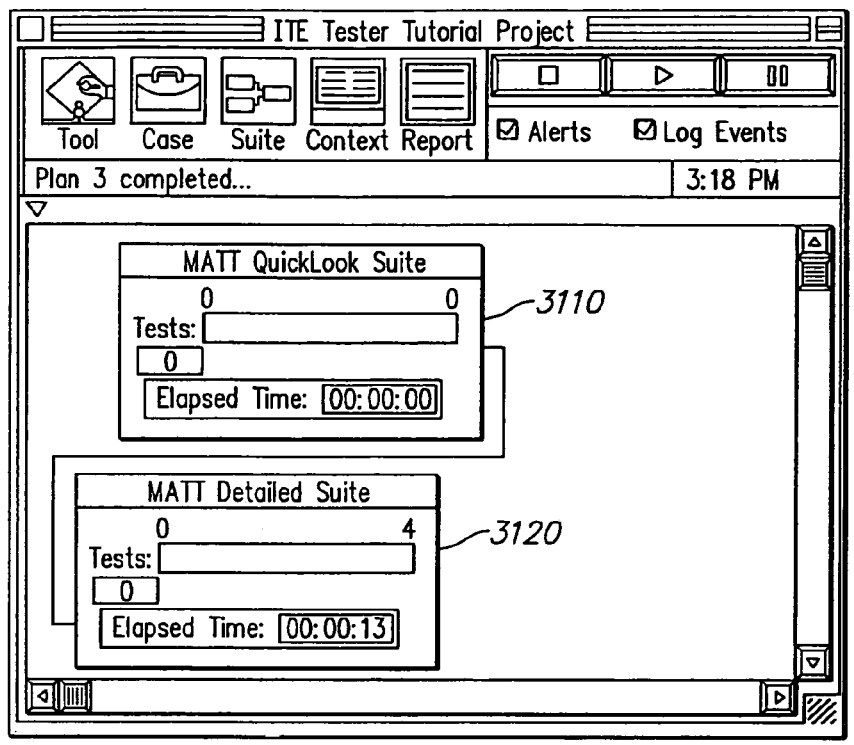
Figure 32:
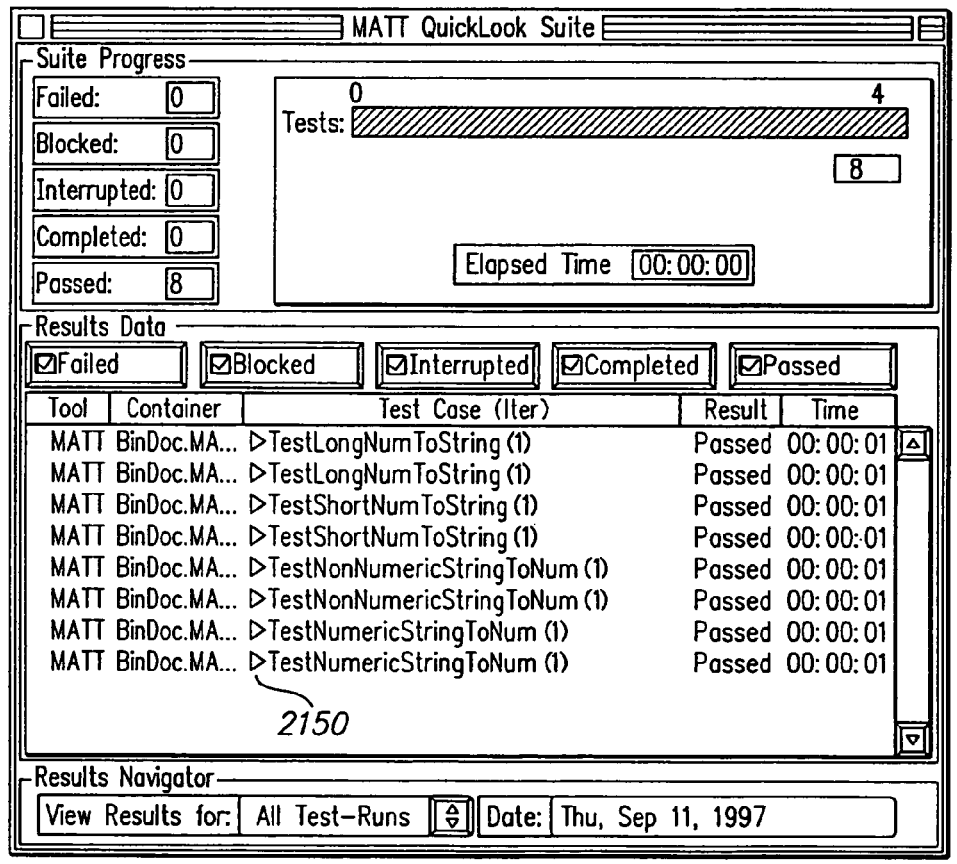

To inspect the test suites, the user can double-click on the gray regions at the top of the suite boxes to open the corresponding suite windows (providing a view of the test groups in each test suite as described above). Further, the user can access the above described Add Cases dialog boxes to view test cases within the test groups. Once the user is satisfied that the suites, groups and cases in the test project are suitable, he or she can run the test project by clicking on the start control button 562. When execution of the test project is complete, the suite boxes indicate the results (e.g., passed or failed) and the elapsed time for the overall test suites as shown in FIG. 30. The user can then inspect the test results in more detail, for example by clicking the report manager button 550 of the main application view. Doing so opens up the report manager view as shown in FIG. 31. As shown, report icons 3110, 3120 are provided for each of the two test suites. Double-clicking on the Quick Look Suite report icon 3110 opens up a corresponding test report browser as shown in FIG. 32. The user can then inspect the test results for each individual test case (e.g., by clicking on the corresponding expansion triangles) and thereafter exit the integrated testing application if desired.

As described above, an integrated testing application according to the invention can also be used by an application test developer to create customized test projects which can be saved for later use by the test developer and by others. Advantageously, such a test developer can create entirely new projects, modify existing projects and/or create new combinations of existing projects.

Figure 33:
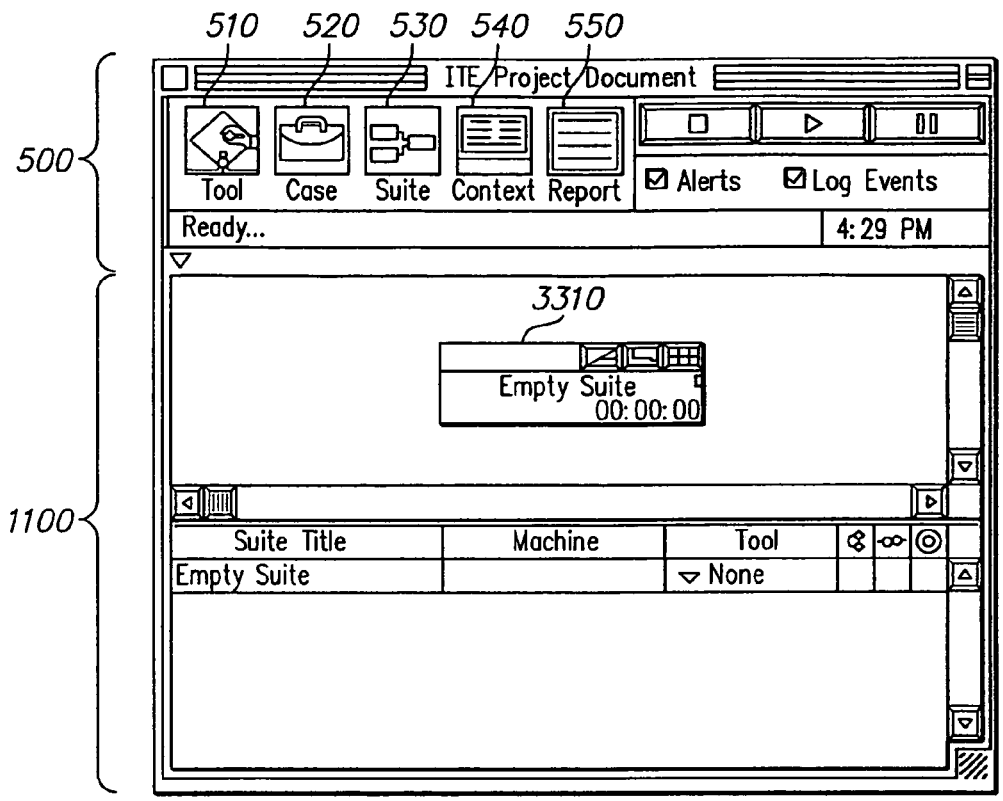
FIG. 33-49 are exemplary displays provided by an integrated testing application according to the invention when the application is used for test development.

According to exemplary embodiments, such a test developer launches an integrated testing application by double-clicking on an appropriate application icon (e.g., the application icon 2820 of FIG. 28). Doing so presents the user with the integrated application interface as shown in FIG. 33. In FIG. 33, the main user interface 500 and the suite manager interface 1100 are visible, and the (new) test project is seen to include a single empty test suite 3310. To add test cases to the empty test suite, the user may first wish to browse the computer network upon which the integrated testing application is running to locate available tool machines and to select several available tools for inclusion in the new test project. To do so, the user clicks on the tool manager button 510 to open the tool manager interface as shown, by way of example, in FIG. 34.

Figure 34:
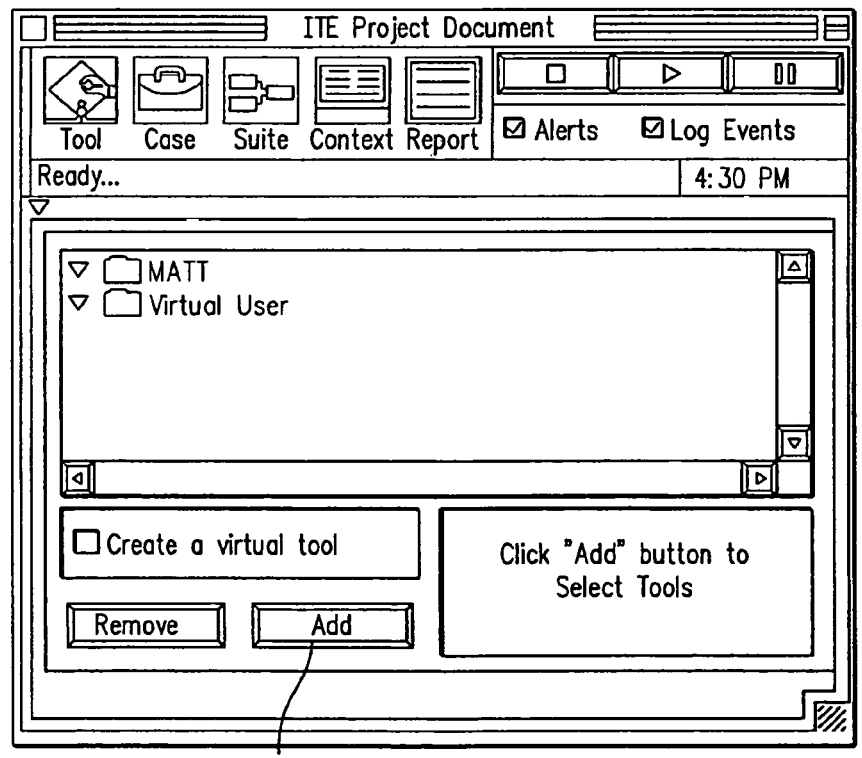
Figure 35:
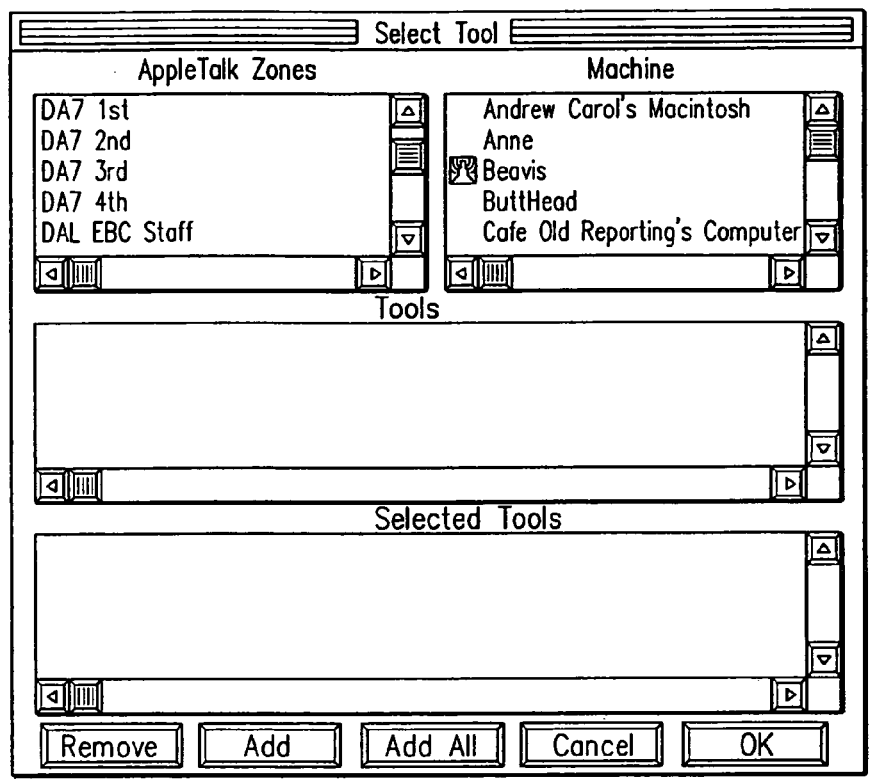
Figure 36:
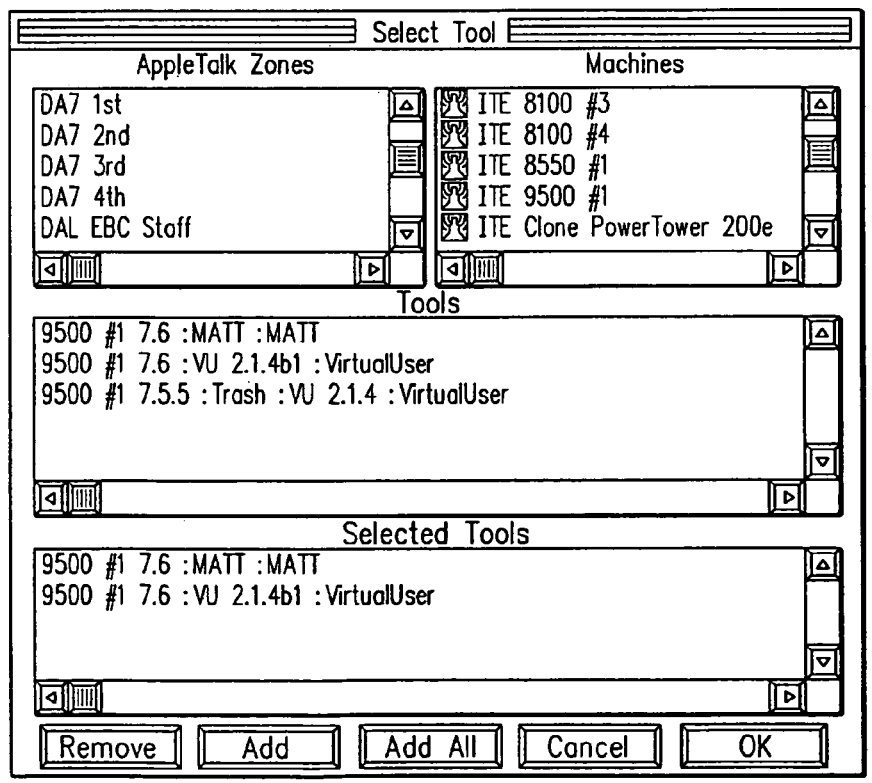
Figure 37:
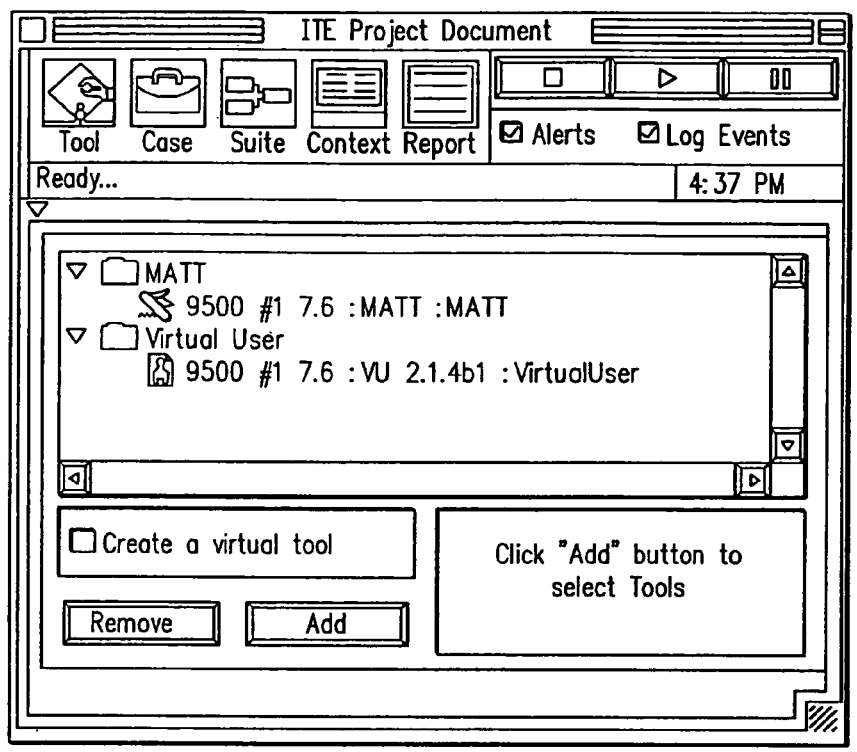

In FIG. 34, two known tools (MATT and VU) are displayed. The user can then click on the Add button 620 of the tool manager interface to access the tool selection dialog box as shown in FIG. 35. If the user then selects, for example, the network zone DA7 1st and the tool machine ITE 9500 #1, he or she is presented with the instances of the known tools (i.e., VU and MATT in this example) available on that particular machine as shown in FIG. 36. The user can then select particular test tools and click OK to close the tool selection dialog box and return focus to the tool manager display as shown in FIG. 37. In FIG. 37, two selected test tools (one of type VU and one of type MATT) are visible.

Figure 38:
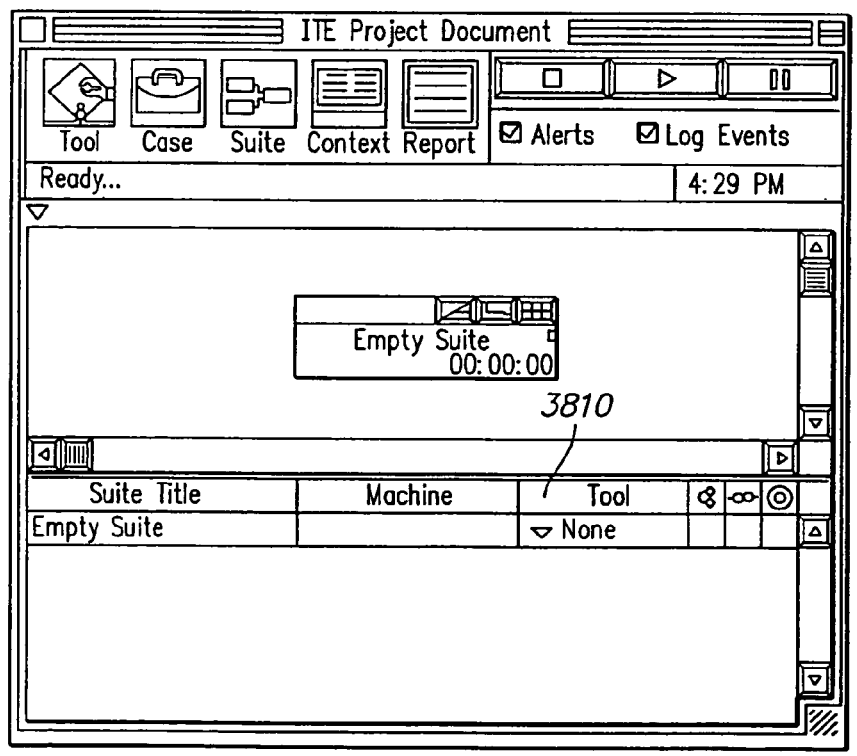
Figure 39:
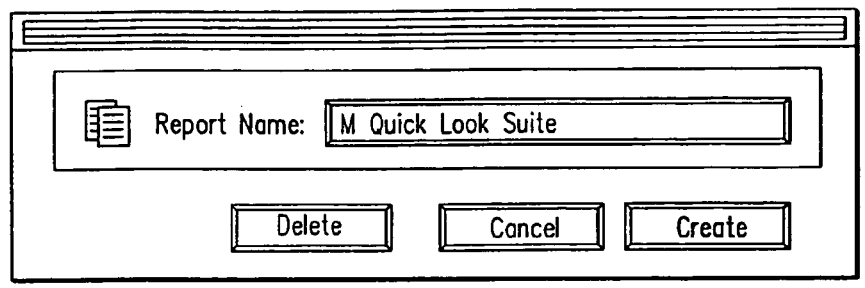

Next, the user can create a first test suite, for example by clicking the suite manager button 530 to return to the suite manager display as shown in FIG. 38. There the user can change the name of the empty suite to a more suitable name, for example by clicking on the name either in the suite box in the middle region of the suite manager display or in the table in the lower region of the suite manager display. To associate a specific tool with the suite, the user can use a pop-up menu provided in a tool column 3810 of the table in the lower region of the test suite display. To also associate a report with the suite, the user can click on the report button on the suite box and thereby access a report dialog box as shown in FIG. 39.

Figure 40:
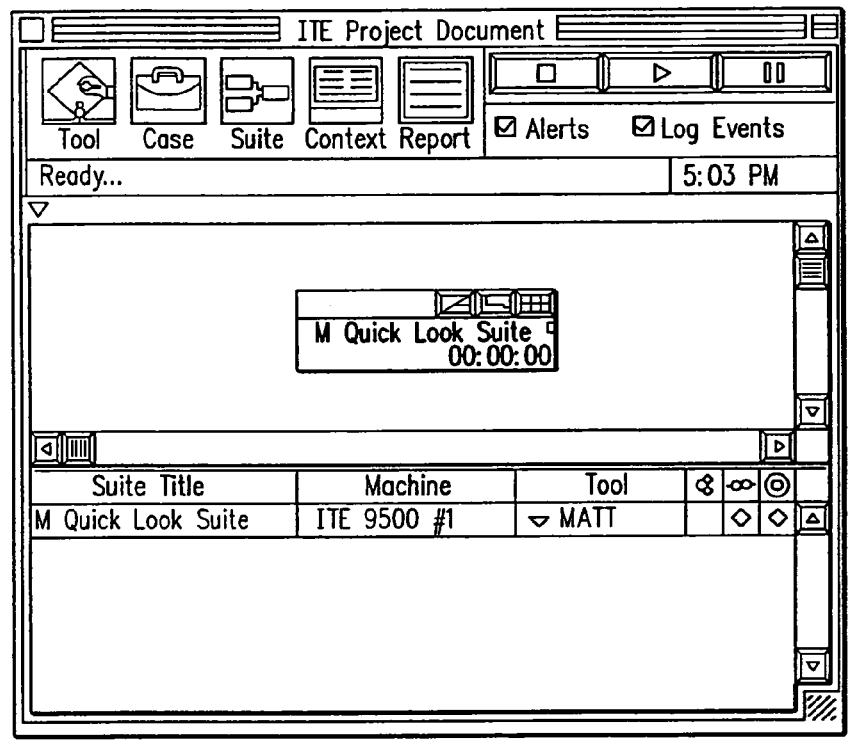
Figure 41:
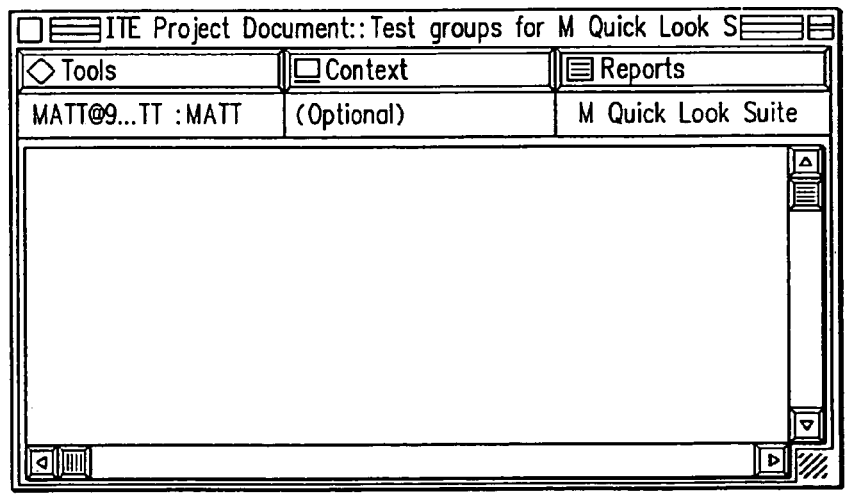
Figure 42:
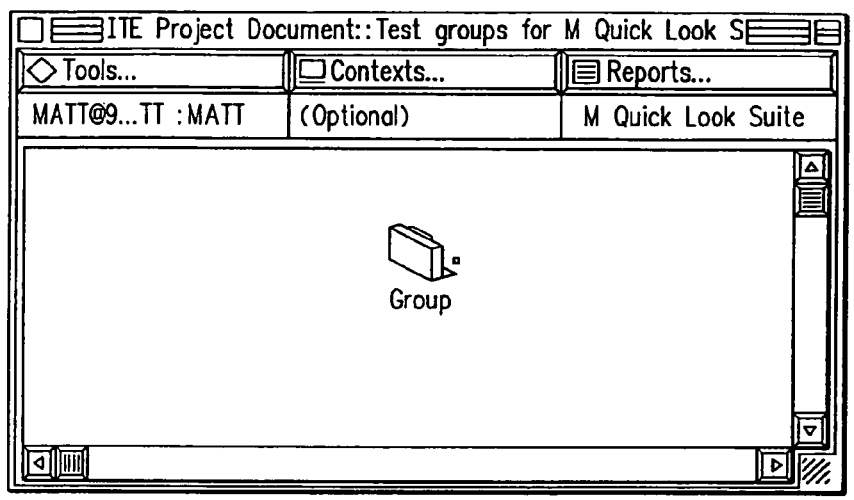

Once the suite has been named and a report has been optionally associated with it, the main interface window might look as shown in FIG. 40, wherein the new test project includes a single test suite named Quick Look Suite which in turn includes a MATT test tool. The user can then double-click in the gray region on the suite box to open the corresponding suite window as shown in FIG. 41. Using a Create Test Groups menu command under the suite menu, the user can create a single test group as described above and as shown in FIG. 42. To add test cases to the initially empty test group, the user can double-click directly on the Group icon to access the Add Test Cases dialog box as described above and as shown in FIG. 43.

Figure 43:
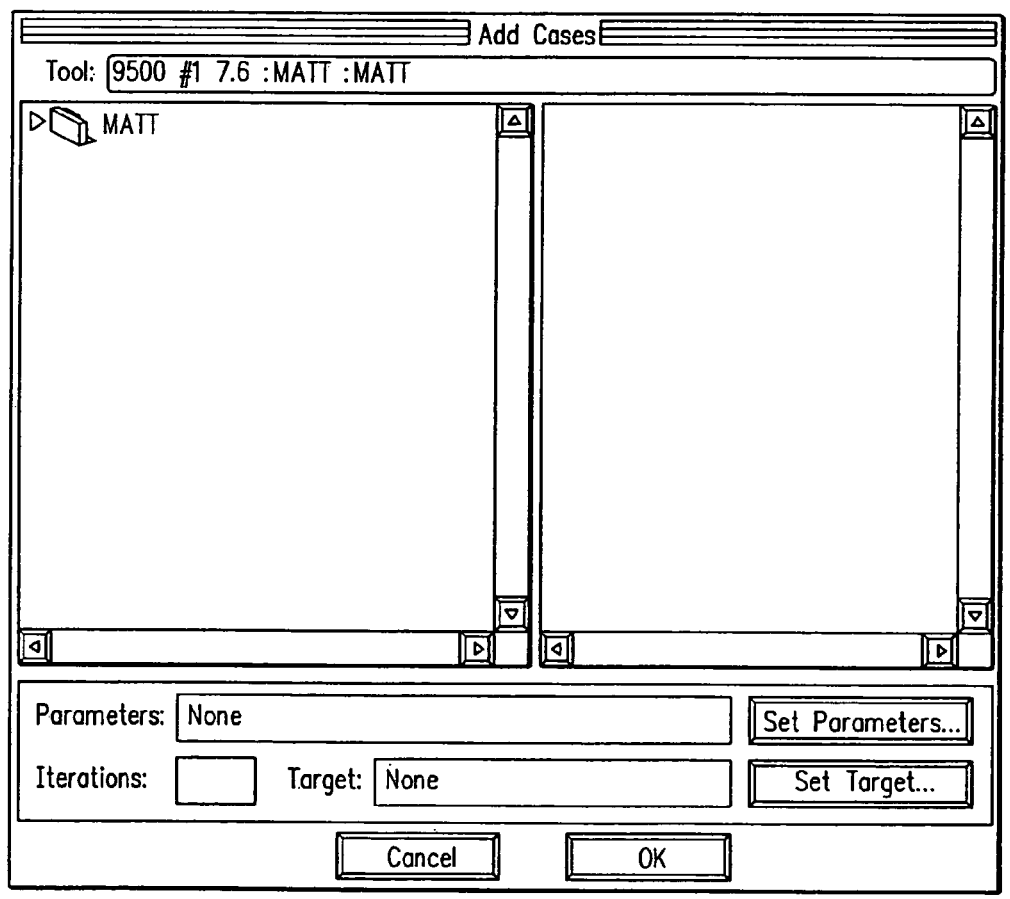
Figure 44:
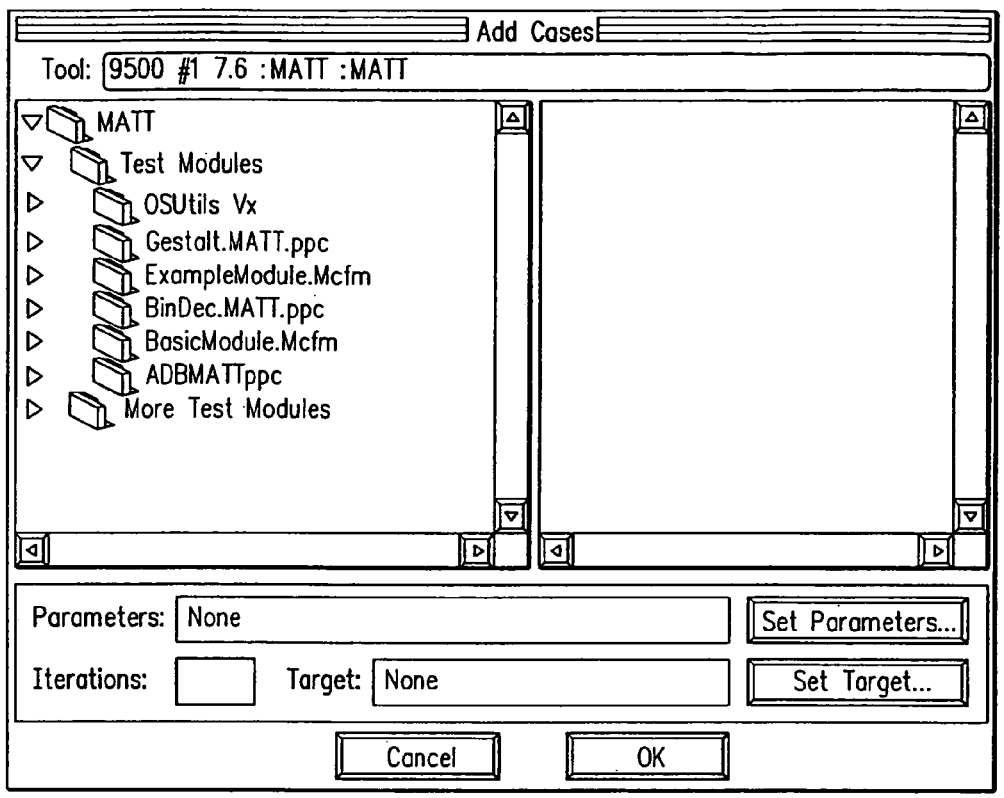
Figure 45:
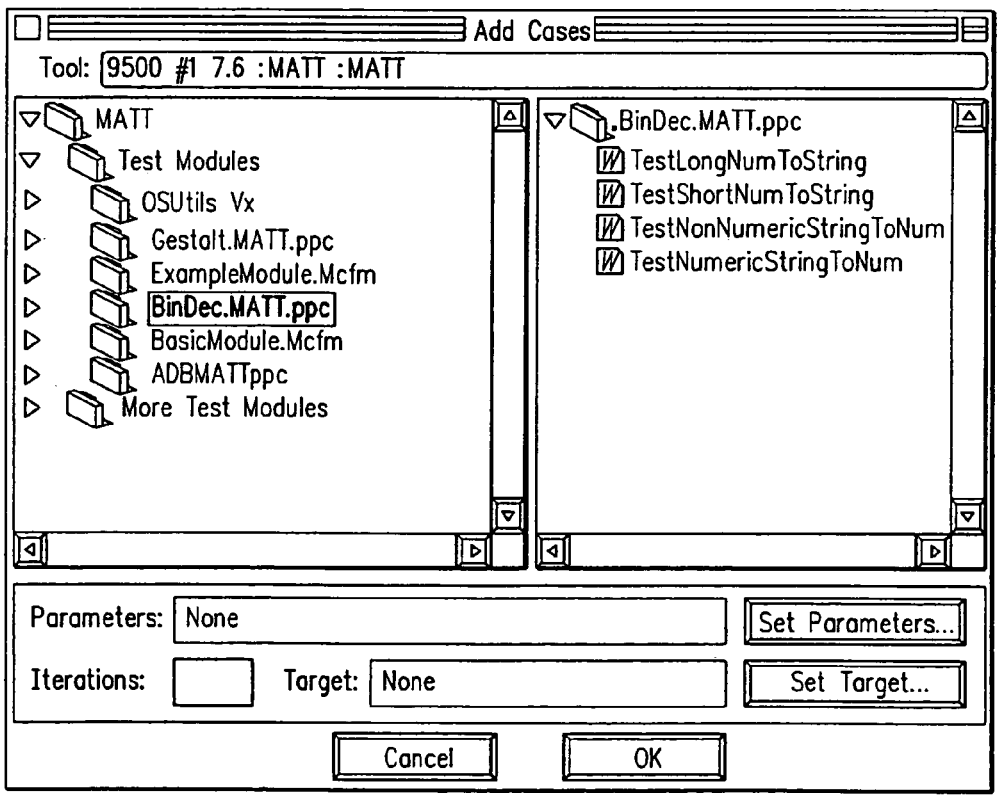
Figure 46:
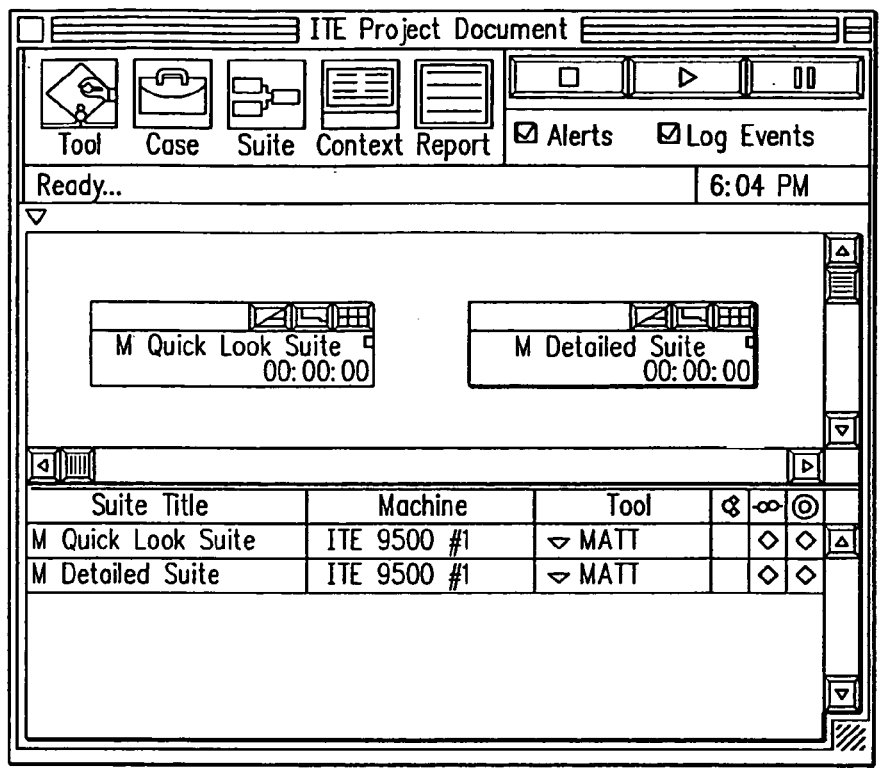

In FIG. 43, the tool type selected for the test suite (i.e., MATT in the example) is displayed. The user can then obtain a list of test cases available to the selected test tool, and add selected cases to the test group. To do so, the user clicks on an expansion triangle 4310 for the selected test tool to view the available test cases. According to exemplary embodiments, the first time a tool is accessed, the integrated testing application directs the tool to provide a list of all test cases installed on the tool machine. A list of available test cases might look as shown in FIG. 44. Available test cases and test case groupings can then be added to the test group, for example by dragging them from the left area of the Add Cases dialog box to the right area of the Add Cases dialog box. An exemplary list of selected test cases is shown in FIG. 45. Thereafter, the user can click OK to add the selected test cases to the test group and return to the suite manager. If desired, the user can then create additional test suites by repeating the above described steps. Further, the user can duplicate test suites and test groups (e.g., via a main menu of the integrated testing application or the case manager). FIG. 46 depicts an exemplary suite manager view wherein the example new test project is seen to include two test suites.

Figure 47:
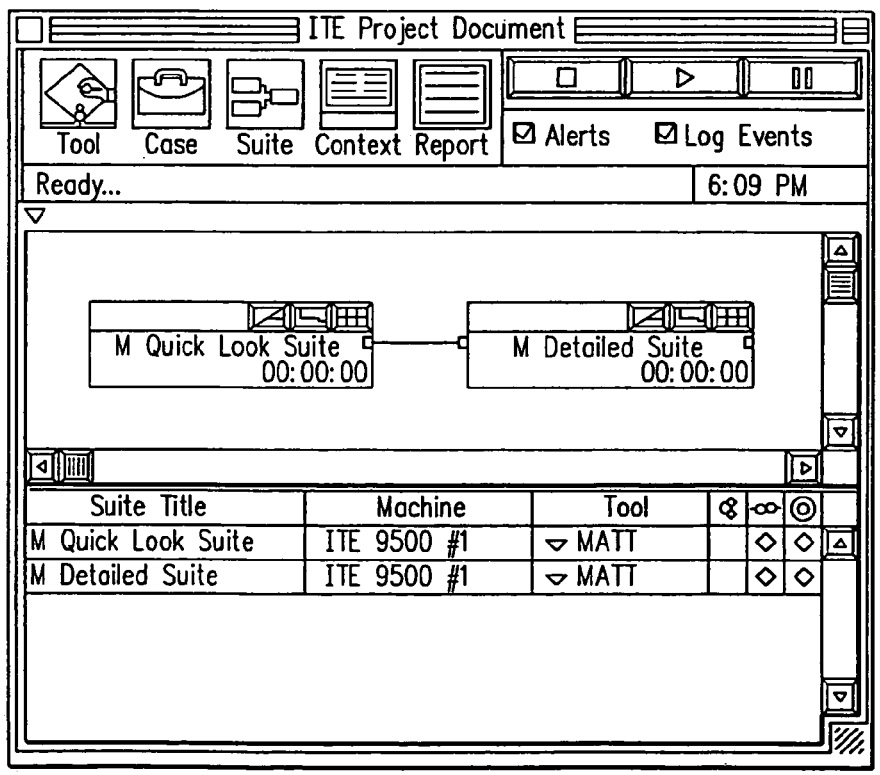

Next, the user can link the test suites to provide conditional execution if desired. To do so, the user clicks on the link region of one test suite and drags it to another test suite. Once a link is created, the user can click on the link to thereby bring up a pop-up menu in which the user can specify the link type as described above. For example, in FIG. 47, a Run on Success link has been created between the first and second suites of the exemplary new test project (thus, the second suite will run only if the first suite runs successfully).

Figure 48:
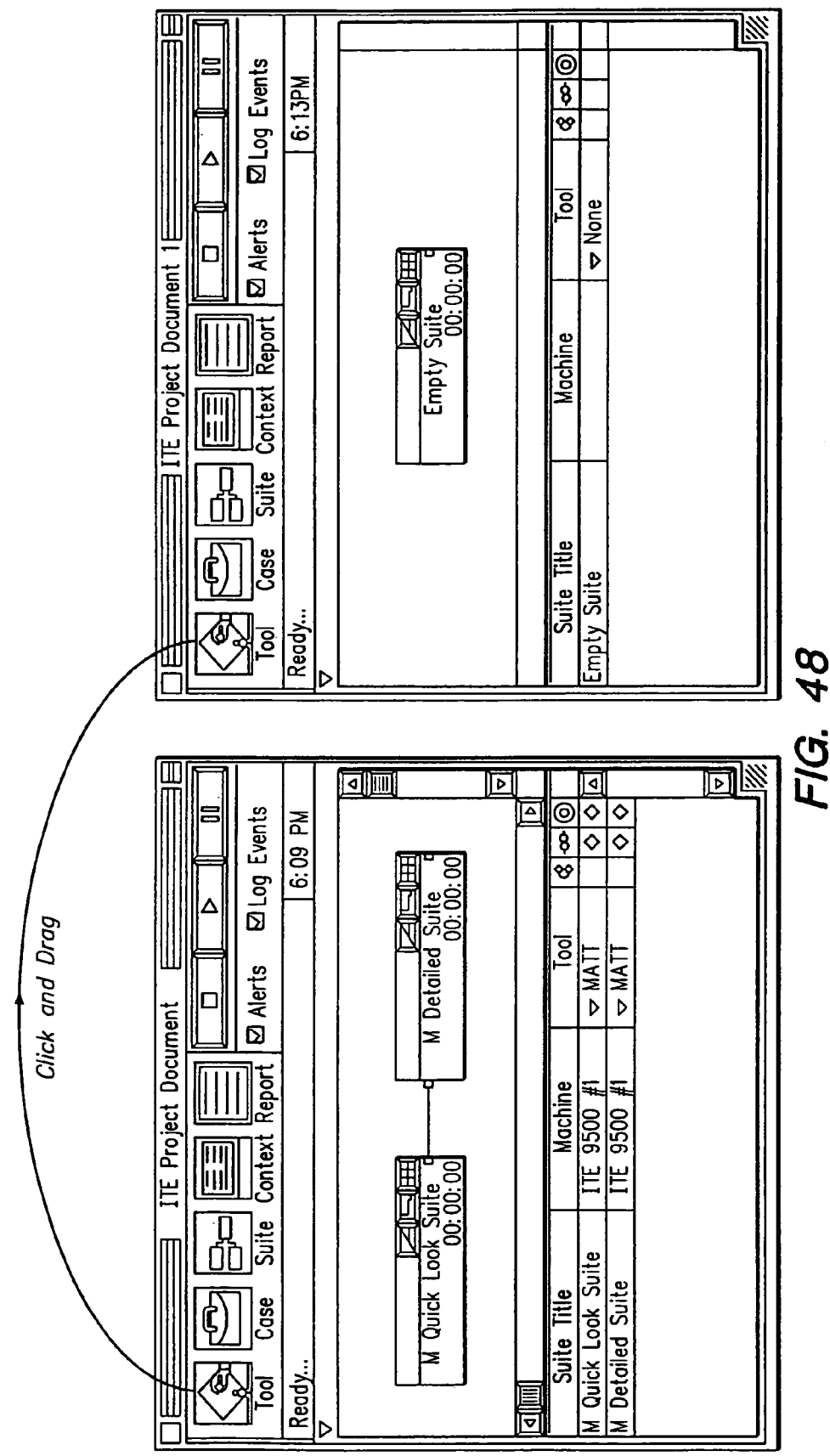
Figure 49:
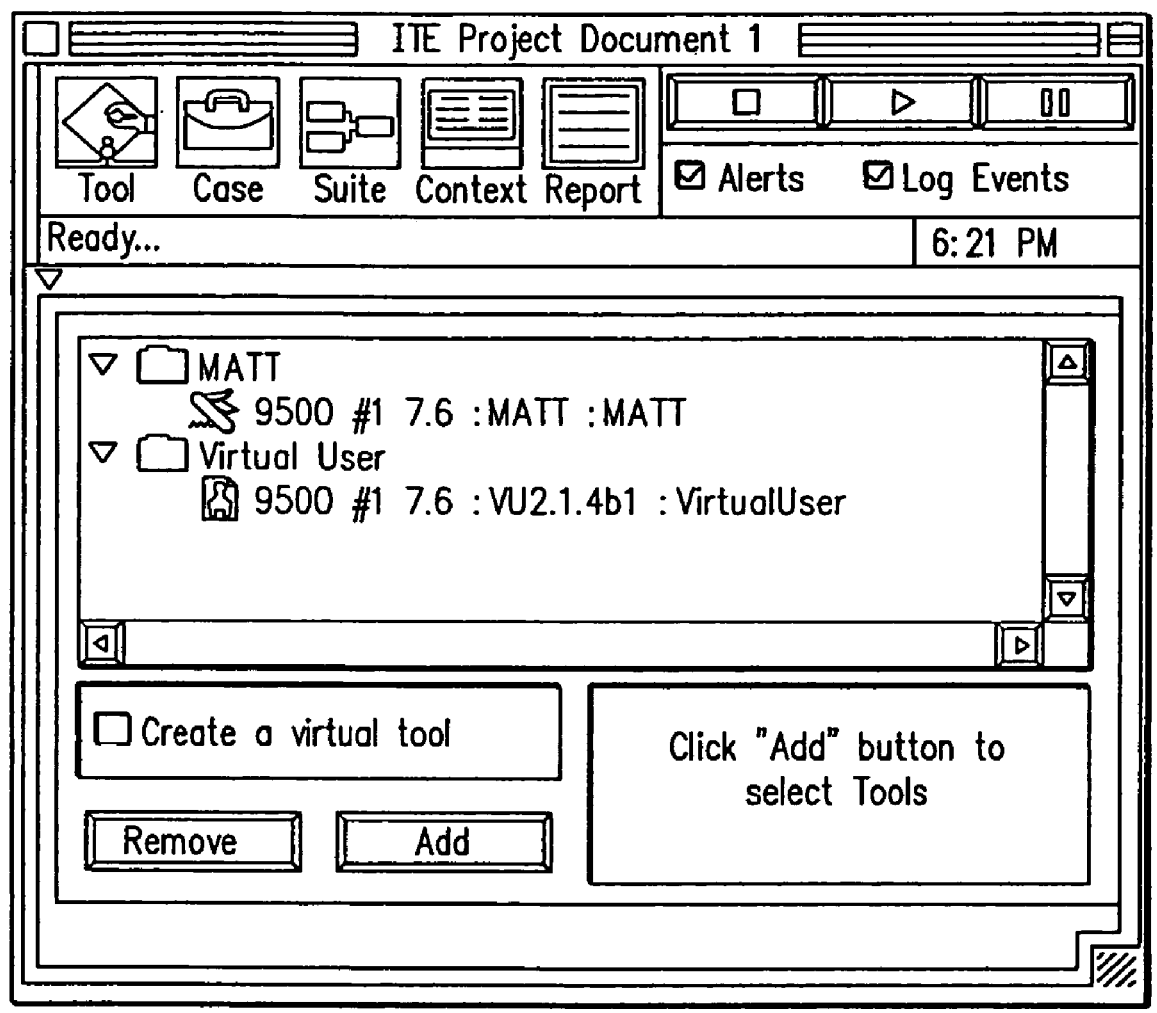

Once the new test project has been created, it can be executed immediately or saved for later execution. Exemplary techniques for executing and/or saving an existing test project are described above. Alternatively, data from the newly created (or existing test project) can be copied to another test project. For example, if two projects are opened simultaneously, all of the available tools from one of the projects can be copied to the second project by clicking on the tool manager button of the first project and dragging it to the tool manager button of the second project as shown in FIG. 48. As shown in FIG. 49, the available tools of the first project are then also available in the second project. Similar saving and copying functions can be carried out for test cases, test contexts and test reports.

In sum, the invention provides methods and apparatus for constructing integrated computer testing and task management applications. Applications according to the invention provide a computer user uniform access to multiple testing or task management tools available on a network. Using the methods and apparatus of the invention, organizations can combine, schedule, regress, and report tests and other tasks with a degree of flexibility not previously possible using conventional techniques.

Those skilled in the art will appreciate that the present invention is not limited to the specific exemplary embodiments which have been described herein for purposes of illustration and that numerous alternative embodiments are also contemplated. The scope of the invention is therefore defined by the claims which are appended hereto, rather than the foregoing description, and all equivalents which are consistent with the meaning of the claims are intended to be embraced therein.

What is claimed is:

1. A system stored on a computer-readable storage medium for testing computer software, comprising:
    a plurality of heterogeneous test tools;
    a testing application that provides a single user interface that enables a user to collectively access each of said plurality of heterogeneous test tools; and
    a plurality of modules that interact with said testing application to enable the user to create and modify, via said interface, a test that is implemented with said plurality of test tools, including:

a tool manager module that enables the user to select one or more tools, from among said plurality of test tools, to be employed in a test;

a case manager module that enables the user to select test cases, each comprising an elemental executable test, that are performed by selected tools, for inclusion in the test; and a suite manager module that enables the user to create, modify and select test suites, each comprising at least one group of selected test cases, to be executed during the test, wherein said suite manager module enables the user to link multiple test suites to determine an order of execution, and wherein at least some links connecting test suites are conditional, and selectively determine whether a test suite is to be executed, in dependence upon whether the results of the test performed by a prior test suite to which it is linked were successful.

2. The system of claim 1, wherein said plurality of modules further includes a context manager module that enables the user to specify hardware and/or software requirements for the execution of a test suite.

3. The system of claim 1, wherein said plurality of modules further includes a report manager module that enables the user to create and obtain, via said interface, a report of results for a test suite.

4. The system of claim 3 wherein said report provides results during the execution of the test suite.

5. A computer-readable medium containing:

a testing application that provides a single user interface that enables a user to collectively access each of a plurality of heterogeneous test tools; and a plurality of modules that interact with said testing application to enable the user to create and modify, via said interface, a test that is implemented with said plurality of test tools, including:

a tool manager module that enables the user to select one or more tools, from among said plurality of test tools, to be employed in a test;

a case manager module that enables the user to select test cases, each comprising an elemental executable test, that are performed by selected tools, for inclusion in the test; and a suite manager module that enables the user to create, modify and select test suites, each comprising at least one group of selected test cases, to be executed during the test, wherein said suite manager module enables the user to link multiple test suites to determine an order of execution, and wherein at least some links connecting test suites are conditional, and selectively determine whether a test suite is to be executed, in dependence upon whether the results of the test performed by a prior test suite to which it is linked were successful.

6. The computer-readable medium of claim 5, further including a context manager module that enables the user to specify hardware and/or software requirements for the execution of a test suite.

7. The computer-readable medium of claim 5, further including a report manager module that enables the user to create and obtain, via said interface, a report of results for a test suite.

8. The computer-readable medium of claim 7 wherein said report provides results during the execution of the test suite.

* * * * *